(12) United States Patent
Austin

(10) Patent No.: US 6,643,691 B2
(45) Date of Patent: Nov. 4, 2003

(54) ASSEMBLY OF A GRAPHICAL PROGRAM FOR ACCESSING DATA FROM A DATA SOURCE/TARGET

(75) Inventor: Paul F. Austin, Austin, TX (US)

(73) Assignee: National Instruments Corporation, Austin, TX (US)

( * ) Notice: Subject to any disclaimer, the term of this patent is extended or adjusted under 35 U.S.C. 154(b) by 0 days.

(21) Appl. No.: 10/027,363

(22) Filed: Dec. 19, 2001

(65) Prior Publication Data
US 2002/0059401 A1 May 16, 2002

Related U.S. Application Data

(62) Division of application No. 09/185,161, filed on Nov. 3, 1998, now Pat. No. 6,370,569.
(60) Provisional application No. 60/065,557, filed on Nov. 14, 1997.

(51) Int. Cl.$^7$ ................................................. G06F 15/16
(52) U.S. Cl. ...................... 709/217; 709/229; 709/227; 709/218; 709/219
(58) Field of Search ................................ 709/229, 227, 709/217, 218, 219

(56) References Cited

U.S. PATENT DOCUMENTS

| | | | |
|---|---|---|---|
| 5,706,507 A | 1/1998 | Schloss | |
| 5,774,664 A | 6/1998 | Hidary et al. | |
| 5,793,964 A | * 8/1998 | Rogers et al. | ............... 709/202 |
| 5,878,219 A | 3/1999 | Vance, Jr. et al. | |
| 5,890,172 A | 3/1999 | Borman et al. | |
| 5,974,416 A | 10/1999 | Anand et al. | |
| 6,041,360 A | 3/2000 | Himmel et al. | |
| 6,065,048 A | * 5/2000 | Higley | .................... 707/501.1 |
| 6,076,733 A | 6/2000 | Witz, Sr. et al. | |
| 6,101,510 A | 8/2000 | Stone et al. | |
| 6,119,153 A | 9/2000 | Dujari et al. | |
| 6,138,150 A | 10/2000 | Nichols et al. | |
| 6,163,779 A | 12/2000 | Mantha et al. | |
| 6,175,862 B1 | 1/2001 | Chen et al. | |
| 6,192,415 B1 | * 2/2001 | Haverstock et al. | ........ 707/513 |
| 6,209,029 B1 | * 3/2001 | Epstein et al. | ............... 709/219 |
| 6,338,096 B1 | * 1/2002 | Ukelson | ..................... 709/246 |

OTHER PUBLICATIONS

Instrumentation Reference and Catalogue 1997, Test and Measurement Industrial Automation, Internet–Ready Software Development, pp 2–91–2–92.

* cited by examiner

*Primary Examiner*—Krisna Lim
(74) *Attorney, Agent, or Firm*—Meyertons Hood Kivlin Kowert & Goetzel, P.C.; Jeffrey C. Hood

(57) ABSTRACT

A Data Socket client and associated applications and/or tools which provide programs with access to data from various sources and having various types or formats, wherein the access is provided invisibly to the user. The Data Socket client allows the user or program to access any data source available on the user's machine as well as data anywhere on a network, such as a LAN, WAN or the Internet. In the preferred embodiment, the Data Socket client addresses data sources or I/O sources using a URL (uniform resource locator), much the way that a URL is used to address web pages anywhere in the world. The present invention also includes new Data Socket URLs which allow the user to access I/O sources.

29 Claims, 17 Drawing Sheets

The Data Socket Component On A VisualBasic Form

Visual Basic Code For The Program Depicted In Fig. 8

The Visual Basic Program Of Figs. 8 And 9 During Execution

LabVIEW Application Using The Data Socket: Front Panel

Data Socket Server Example

URL can also identify where data is read from. In this case from a CWDataServer

URL Identifies where data is written. In this case to a CWDataServer

ASSEMBLY OF A GRAPHICAL PROGRAM FOR ACCESSING DATA FROM A DATA SOURCE/TARGET

PRIORITY CLAIM

This application is a divisional of U.S. utility application Ser. No. 09/185,161, now U.S. Pat. No. 6,370,569 B1 issued Apr. 9, 2002, titled "Data Socket System and Method for Accessing Data Sources Using URLs" filed Nov. 3, 1998, whose inventor is Paul F. Austin which claims benefit of priority of U.S. provisional application Serial No. 60/065,557 titled "Data Socket Client for Improved Data Access" filed Nov. 14, 1997, whose inventor is Paul F. Austin.

BACKGROUND OF THE INVENTION

1. Field of the Invention

The present invention relates to the field of graphical and non-graphical software controls, and more particularly to a Data Socket client for accessing data from any of various locations and having any of various formats.

2. Description of the Related Art

In modern networked computer systems, the computer system may be required to obtain data from various sources, including local memory on the computer system, external data sources connected to the computer system, such as I/O devices connected to computer system ports, and other networked computer systems, such as computer systems connected to a LAN, WAN or to the Internet. When a program executing on a computer system is required to access data, the program is often required to account for the source or location of the data, opening and closing of files, the format of the data, and conversion of the data to readable formats, among others.

One of the biggest challenges in developing complex applications that are comprised of different components is sharing and exchanging information and data between the different components. Today, this task is solved using a number of different existing tools, including writing and reading files, DDE, ActiveX automation, http server and client tools, and more. In addition, measurement, as well as other engineering applications, often place some special requirements on sharing data, such as providing additional information qualifying the data.

Hence, an improved system and method is desired for providing programs with access to data from various sources and having various types or formats, wherein the access is provided invisibly to the user or programmer.

Background on component software concepts is deemed appropriate. Various object-oriented and component-based software standards have been developed in recent years. For example, Active X Controls, formerly called OLE controls, are software components that conform to a standard defined by Microsoft. In many ways, Active X controls are similar to traditional libraries. However, since the standard is well defined, there are many applications that can use any Active X control simply by providing support for the Active X standard. Applications or programming environments which support Active X controls are commonly referred to as "Active X Control Containers" or simply "containers". Broadly speaking, a container is a software entity which holds software components. Examples of containers are Microsoft's "Excel" spreadsheet product, "Word" word processor, "Access" database product, and the Visual Basic programming environment. The Active X standard affords software application developers the opportunity to develop custom Active X controls to add into and use in their software applications.

Controls are typically objects and/or have object-oriented features. Therefore, each control has its own set of methods, events and properties. A method is a function which acts on or is performed by a particular control. For example, a control may possess a "move" method to move the control around on a display screen. An event is an action recognized by a control, such as clicking a mouse or pressing a key. A control has associated code which executes in response to an event recognized by the control. A property is the control's data (settings or attributes), such as color, shape or size. The properties of a control may be edited, i.e., changed to create the desired user interface. Controls may have custom properties that are specific to the control.

In order to incorporate a control into an application or a container, the control is placed or "dropped" onto a form. The control has associated properties, which are listed in the Properties window. The developer changes the properties by selecting a property field and changing the value. The control reflects the change when the developer enters the change into the Properties window.

SUMMARY OF THE INVENTION

The present invention comprises a Data Socket client and associated applications and/or tools which provide programs with access to data from various sources and having various types or formats, wherein the access is provided invisibly to the user. The Data Socket client, also referred to as DataSocket, allows the user or program to access any data source available on the user's machine as well as data anywhere on a network, such as a LAN, WAN or the Internet.

In the preferred embodiment, the Data Socket client addresses data sources or I/O sources using a URL (uniform resource locator), much the way that a URL is used to address web pages anywhere in the world. The present invention also includes new Data Socket URLs which allow the user to access I/O sources. When reading from an input source, the Data Socket performs all work necessary to read the raw data from various input sources and to parse the data and return it in a form directly usable by the user's applications. When writing to an output target the Data Socket performs all work necessary to format the data provided by the user into the appropriate raw format for the specific target.

The Data Socket client is preferably a Data Socket control or other type of re-useable software component. The Data Socket client includes a simple set of properties which provides ease of use. The Data Socket client includes a property referred to as URL which is used to specify the data source. The Data Socket client also includes a status property which informs the program using the Data Socket client as to the state of the connection, i.e., whether the socket is unconnected or connected.

In addition to properties, the Data Socket client includes a simple set of events. The primary event is referred to as "DataUpdated" The DataUpdated event is fired whenever the source to which the Data Socket client is connected has a new value to be used by the application program. The Data Socket client also includes an event referred to as "StatusUpdated", which is fired whenever the status of the connection changes. This makes it easy for the client or the application using the Data Socket client to monitor this state and to provide information on the state at a very high level to the end user.

In order to use the Data Socket client, the user places the Data Socket client into a program and preferably configures a URL input mechanism, such as a URL text box. The user or programmer enters a URL into the URL text box associated with the Data Socket client. The URL can also be a standard Internet URL, such as http, ftp, file etc. As an example, the URL can begin with "file:", signifying that a data file is the source of data. The remainder of the URL comprises a path that is meaningful to the machine where the data file resides. This includes files on the local machine or files addressable within the Internet that are accessible by the local machine. Thus the Data Socket client allows a program to address data or files locally, or from a server, or from a peripheral device.

Once the URL is provided, the Data Socket client examines the URL and determines if the Data Socket control can process the data. If so, the Data Socket client retrieves the data. During the data retrieval, the Data Socket client handles opening and closing of the file. The Data Socket client also converts the data to a format useable by the application. In the preferred embodiment, the Data Socket client obtains the data and converts it to a format referred to as a Flex Data object. Once the data has been received and converted, the Data Socket client generates an event to the application program, and the application can receive and process the data.

If the Data Socket client cannot recognize the raw data format, the Data Socket client preferably attempts to find a Data Socket extension or plug-in that can convert the raw data to data usable by the application using the Data Socket. The Data Socket client preferably identifies these extensions by the file suffix, or the mime type associated with the raw data stream. If the data socket client finds an extension that can convert the data from the raw binary contents of the file to data that is directly usable by the program, the Data Socket client creates an instance of the determined extension, and the extension instance retrieves the data and converts the data to a format useable by the application.

The Data Socket can be extended by the user to connect to new or custom I/O devices by creating a Data Socket extension or plug-in. The extension is identified by the access method that a URL begins with. As an example, the industry standard API called OPC (OLE for Process Control), which is used to communicate with hardware PLC devices, can be directly accessed using the simple Data Socket component accesses. If the URL begins with "opc:" and opc is not a URL type for which the Data Socket has built-in support, then the Data Socket will attempt to find an OPC Data Socket extension component that can connect to an OPC I/O device. The specific Data Socket extension parses the remaining part of the URL. The Data Socket extension also determines from the URL how it should use OPC to connect to a specific PLC.

The present invention also includes a new data format referred to as Flex Data or FlexData, as mentioned above. Flex Data is the format of the underlying data packet that Data Socket tools use to send and store information. Flex Data data packets are system independent and can be transferred over existing communication technologies such as ActiveX Automation/COM or TCP/IP. The data packet has provisions for adding standard and user defined named attributes that are used to further describe the information contained in the packet. Information such as a time stamp, test operator name, Unit-Under-Test (UUT) identifier, and more can be added to the data being transferred. Data Socket clients convert data native to an environment and its attributes into Flex Data format or convert Flex Data back into its native data form. The Flex Data packet is self-describing so no additional information must be exchanged between a client and its source or target.

The present invention also includes a program referred to as a Data Socket server which operates to automatically redistribute data to other Data Sockets. The user's application directs the Data Socket client to connect to a Data Socket server by using a URL that begins with the access mode "dstp:" To use the Data Socket server, the Data Socket client writes data to the Data Socket server, which then automatically redistributes the data to other Data Sockets. For the Data Socket client this operation is no different than writing to a file. For the Data Sockets that receive the redistributed data, this operation is similar to reading data from other sources like ftp, http(web), or file servers. The primary difference is that, for the Data Sockets that receive the redistributed data, the event "DataUpdated" is called whenever the first Data Socket writes a new value to the Data Socket server and the new value is redistributed. This allows the receiving Data Sockets to return a continuous stream of data to the user's application instead of just a single value.

The Data Socket client thus provides a new technology and tools that greatly simplify sharing data, such as engineering and scientific data, between different applications or application components. The Data Socket client provides improved sharing of data between components running on the same computer or between different computers on a network.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Incorporation by Reference

The following references are hereby incorporated by reference.

For general information on object oriented programming concepts, please see Booch, *Object-Oriented Analysis and Design with Applications,* The Benjamin/Cummings Publishing Company, Inc., 1994 which is hereby incorporated by reference in its entirety. For information on OLE Controls and COM interfaces, please see *Microsoft OLE Control Developer's Kit,* Microsoft Press, 1994 and Denning, *OLE Controls Inside Out: The Programmer's Guide to Building Componentware with OLE and the Component Object Model,* Microsoft Press, 1995 which are hereby incorporated by reference in their entirety.

Figure 1:
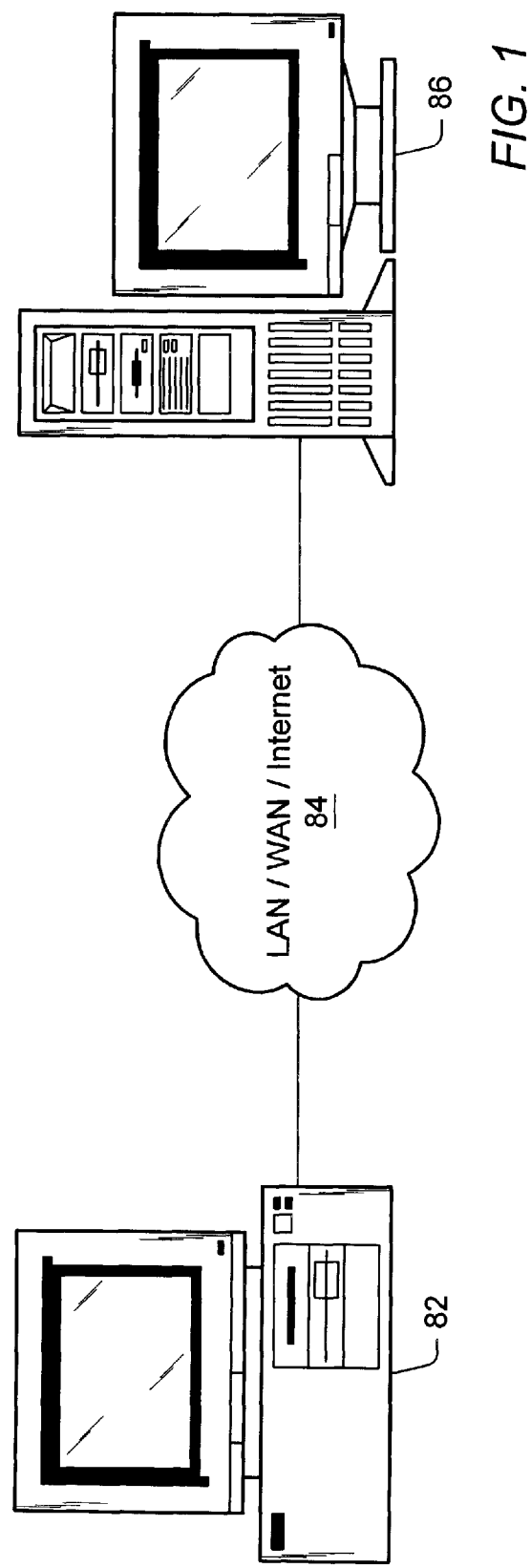
FIG. 1 illustrates a computer system connected through a network to a second computer system.

FIG. 1—Computer System Connected to a Network

FIG. 1 illustrates a computer system 82 connected through a network 84 to a second computer system 86. The computer system 82 and the second computer system 86 can be any of various types, as desired. The network 84 can also be any of various types, including a LAN (local area network), WAN (wide area network), or the Internet, among others.

The computer system 82 includes or stores a Data Socket client according to the present invention. Applications executing in the computer system 82 are operable to use the Data Socket client according to the present invention to access data located locally on the 82 or located to the second computer system 86 through the network 84. The Data Socket client provides access to data stored and/or located in various manners. For example, the Data Socket client provides access to data located in the system memory or non-volatile memory of the computer 82.

The Data Socket client also provides access to data stored in or generated by peripheral devices connected to the computer system 82, such as peripheral devices connected to the computer's serial port, e.g., the RS-232 port, RS-485 port, a USB (Universal Serial Bus) port, an IEEE 1394 port, or an IEEE 1394.2 port, etc. The Data Socket client also provides access to data stored in or generated by peripheral devices connected to the parallel port of the computer system 82. The Data Socket client also provides access to data stored in or generated by peripheral devices connected to a bus of the computer system 82, such as the PCI (Peripheral Component Interconnect) bus, the ISA (Industry Standard Architecture) bus, and the NuBus, among others. Examples of these peripheral devices include instrumentation devices, industrial automation devices, process control devices, multimedia devices, e.g., video and/or audio devices, etc.

As noted above, the Data Socket client also provides access to data stored in or generated by computers or devices connected to the computer system 82 through the network 84, such as the computer system 86. As also noted above, the network 84 can be any of various types, including a LAN (local area network), such as an Ethernet network, or a WAN (wide area network), or the Internet, among others.

Thus the Data Socket client enables access to data stored locally on or proximate to the computer 82 as well as data stored in a computer or device 86 connected through any of various types of networks 84 to the computer 82. The Data Socket client provides this data access invisibly to the user, i.e., the user is not required to create program code to access the data, open or close files, or handle data format conversions.

The Data Socket client is preferably a re-useable software component, such as a control or object. The Data Socket client may also take other forms, such as a LabVIEW VI, a DLL, or others.

Figure 2A:
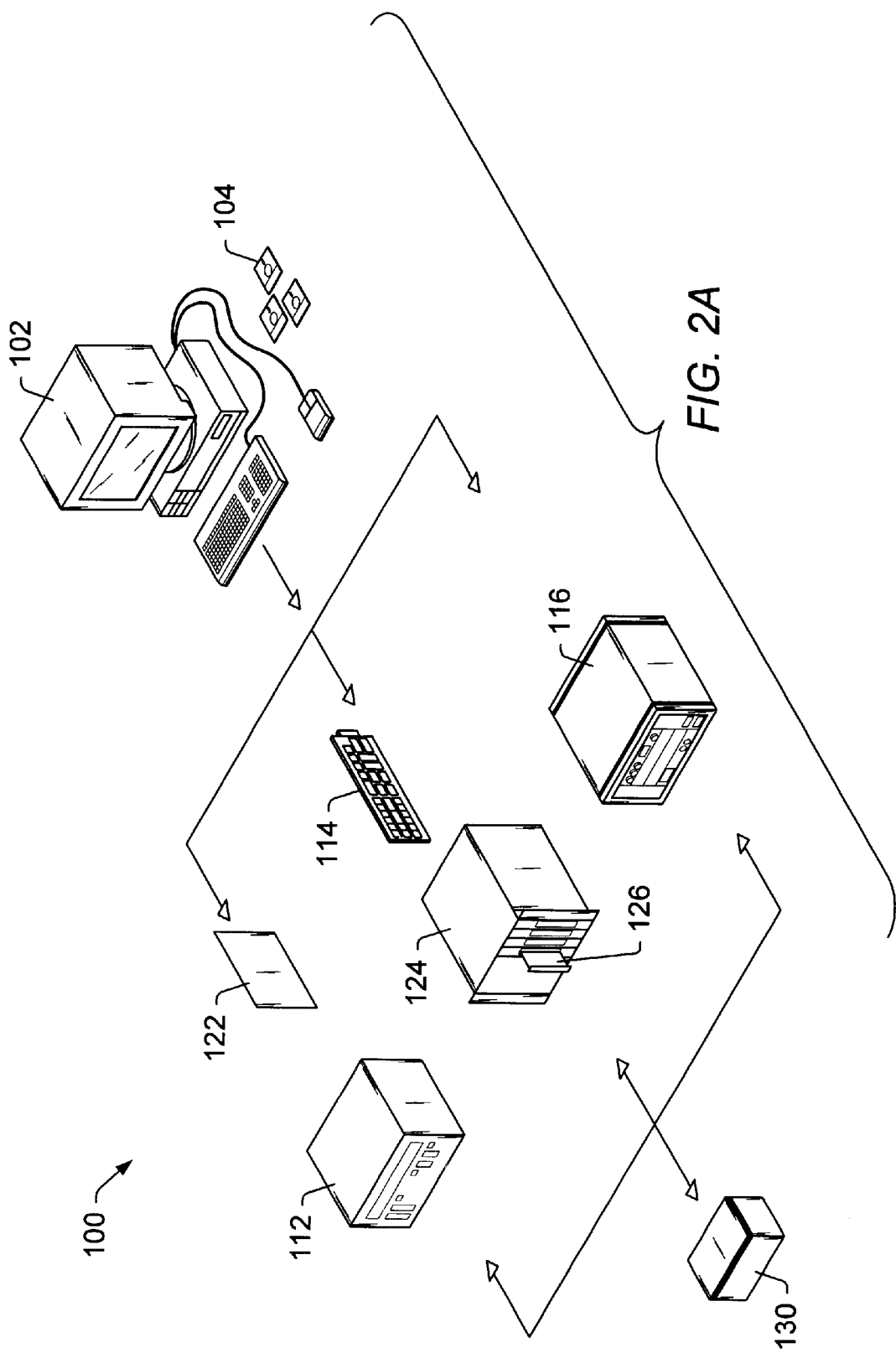
FIGS. 2A and 2B illustrate representative instrumentation and process control systems including various I/O interface options.
Figure 2B:
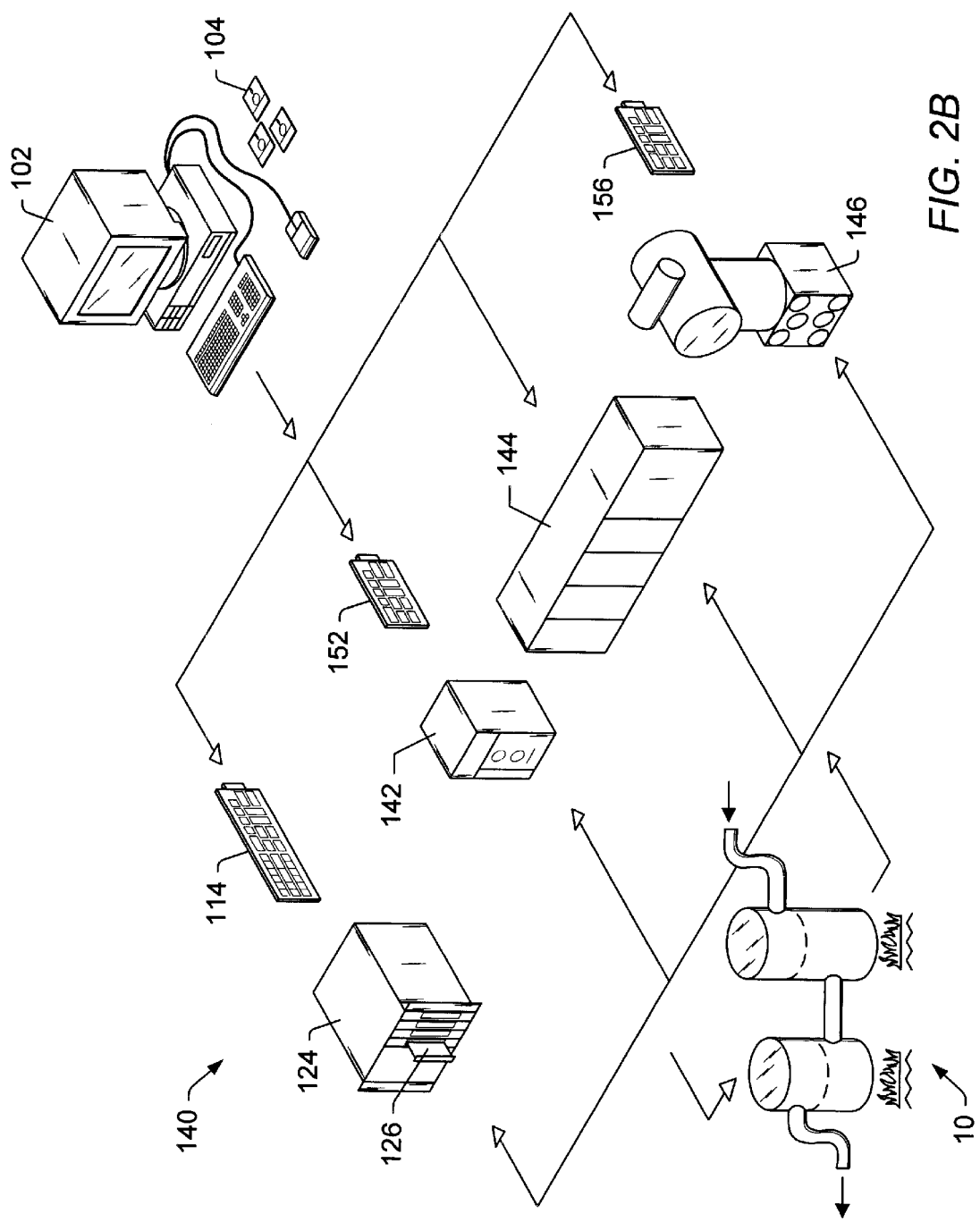

FIGS. 2A and 2B—Instrumentation and Industrial Automation Systems

FIG. 2A illustrates an instrumentation control system 100, which is one example of the use of the present invention. The system 100 comprises a host computer 102 which connects to one or more instruments. The host computer 102 comprises a CPU, a display screen, memory, and one or more input devices such as a mouse or keyboard as shown. The computer 102 connects through the one or more instruments to analyze, measure or control a unit under test (UUT) or process 130. The host computer 102 stores at least one Data Socket client of the present invention for providing access to data stored in or generated by any of the instruments.

The one or more instruments may include a GPIB instrument 112, a data acquisition board 114, and/or a VXI instrument 116. The GPIB instrument 112 is coupled to the computer 102 via a GPIB interface card 122 provided by the computer 102. The data acquisition board 114 is coupled to the computer 102, and preferably interfaces through signal conditioning circuitry 124 to the UUT. The signal conditioning circuitry 124 preferably comprises an SCXI (Signal Conditioning eXtensions for Instrumentation) chassis comprising one or more SCXI modules 126. Both the GPIB card 122 and the DAQ card 114 are typically plugged in to an I/O slot in the computer 102, such as a PCI bus slot, a PC Card slot, or an ISA, EISA or MicroChannel bus slot provided by the computer 102. However, these cards 122 and 114 are shown external to computer 102 for illustrative purposes. The VXI instrument 116 is coupled to the computer 102 via a VXI bus, MXI bus, or other serial or parallel bus provided by the computer 102. The computer 102 preferably includes VXI interface logic, such as a VXI, MXI or GPIB interface card (not shown) comprised in the computer 102.

The one or more instruments may also include PXI (PCI eXtensions for Instrumentation) instruments (not shown), which are preferably comprised in a PXI chassis (not shown) connected to the computer system. In addition, a serial instrument (not shown) may also be coupled to the computer 102 through a serial port, such as an RS-232 port, an RS-485 port, a USB (Universal Serial bus) or IEEE 1394 or 1394.2 bus, provided by the computer 102. In typical instrumentation control systems an instrument will not be present of each interface type, and in fact many systems may only have one or more instruments of a single interface type, such as only GPIB instruments.

The instruments are coupled to the unit under test (UUT) or process 130, or are coupled to receive field signals, typically generated by transducers. The system 100 may be used in a data acquisition and control application, in a test and measurement application, a process control application, or a man-machine interface application.

FIG. 2B illustrates an industrial automation or process control system 140, which is another example of the use of the present invention. The industrial automation system 140 is similar to the instrumentation or test and measurement system 100 shown in FIG. 2A. Elements which are similar or identical to elements in FIG. 1 have the same reference numerals for convenience. The system 140 comprises a computer 102 which connects to one or more devices or instruments. The computer 102 comprises a CPU, a display screen, memory, and one or more input devices such as a mouse or keyboard as shown. The computer 102 connects through the one or more devices to a process or device 150 to perform an automation function, such as MMI (Man Machine Interface), SCADA (Supervisory Control and Data Acquisition), portable or distributed acquisition, advanced analysis, or control. In FIG. 2B, the host computer 102 also stores at least one Data Socket client of the present invention for providing access to data stored in or generated by any of the devices.

The one or more devices may include a data acquisition board 114, a serial instrument 142, a PLC (Programmable Logic Controller) 144, or a fieldbus network card 156. The data acquisition board 114 is coupled to or comprised in the computer 102, and preferably interfaces through signal conditioning circuitry 124 to the process 150. The signal conditioning circuitry 124 preferably comprises an SCXI (Signal Conditioning extensions for Instrumentation) chassis comprising one or more SCXI modules 126. The serial instrument 142 is coupled to the computer 102 through a serial interface card 152, or through a serial port, such as an RS-232 port, provided by the computer 102. The PLC 144 couples to the computer 102 through a serial port, Ethernet port, or a proprietary interface. The fieldbus interface card 156 is preferably comprised in the computer 102 and interfaces through a fieldbus network to one or more fieldbus devices, such as valve 146. Each of the DAQ card 114, the serial card 152 and the fieldbus card 156 are typically plugged in to an I/O slot in the computer 102 as described above. However, these cards 114, 152 and 156 are shown external to computer 102 for illustrative purposes. In typical industrial automation systems a device will not be present of each interface type, and in fact many systems may only have one or more devices of a single interface type, such as only PLCs. The devices are coupled to the device or process 150.

In the present disclosure, the term "instrument" is used to refer to various types of instruments such as GPIB instruments, VXI instruments, PXI instruments and serial instruments. The term "instrument" is also used to refer to a data acquisition (DAQ) board in a computer system and/or a computer system configured with a DAQ board. The term "instrument" is further intended to include industrial automation and process control devices. In addition, the term instrument also refers to "virtual instruments" (combinations of hardware and/or software instruments) executing on a computer system, including VISA resources. In addition, the term "instrumentation system" is used herein to refer to test and measurement systems as well as industrial automation, process control and modeling systems, among others.

Referring again to FIGS. 2A and 2B, the host computer 102 preferably includes a memory media, as represented by memory element 104. Examples of the memory media include an installation media, e.g., CD-ROM, tape drive, or floppy disks 104, a non-volatile memory media, such as a magnetic media, e.g., a hard drive, or optical storage, as well as a volatile or system memory, such as DRAM, SRAM etc. The memory media stores at least one Data Socket client according to the present invention. The memory media also preferably stores a component-based programming development system for developing and executing application programs. These application programs are operable to use the Data Socket client for accessing data. The memory media may also store a Data Socket server according to the present invention.

The host programming development system is preferably a component-based programming environment such as Visual Basic, Visual C++, Delphi, or other similar environments. It is noted that the programming development system may be any of various types of application development systems which allow re-useable software components. The program development system may also comprise a graphical programming system, e.g., LabVIEW, or other types of development environments such as LabWindows\CVI, etc.

The memory media thus stores a Data Socket client according to the present invention, as well as one or more applications which use the Data Socket client. As discussed below, the computer system may also store one or more plug-ins, also referred to as file adapters or extension components, for handling different data formats. The host CPU executing code and data from the system memory comprises a means for performing Data Socket functions according to the steps described below.

In the preferred embodiment, application programs which use the Data Socket client are designed to configure or control instruments or perform instrumentation functions. However, although in the preferred embodiment the Data Socket client is used with application programs which control or communicate with instruments or perform industrial automation, it is noted that the present invention can be used for a plethora of applications and is not limited to instrumentation or industrial automation applications. In other words, FIGS. 2A and 2B are exemplary only, and the present invention may be used in any of various types of systems.

Computer System Block Diagram

Figure 3:
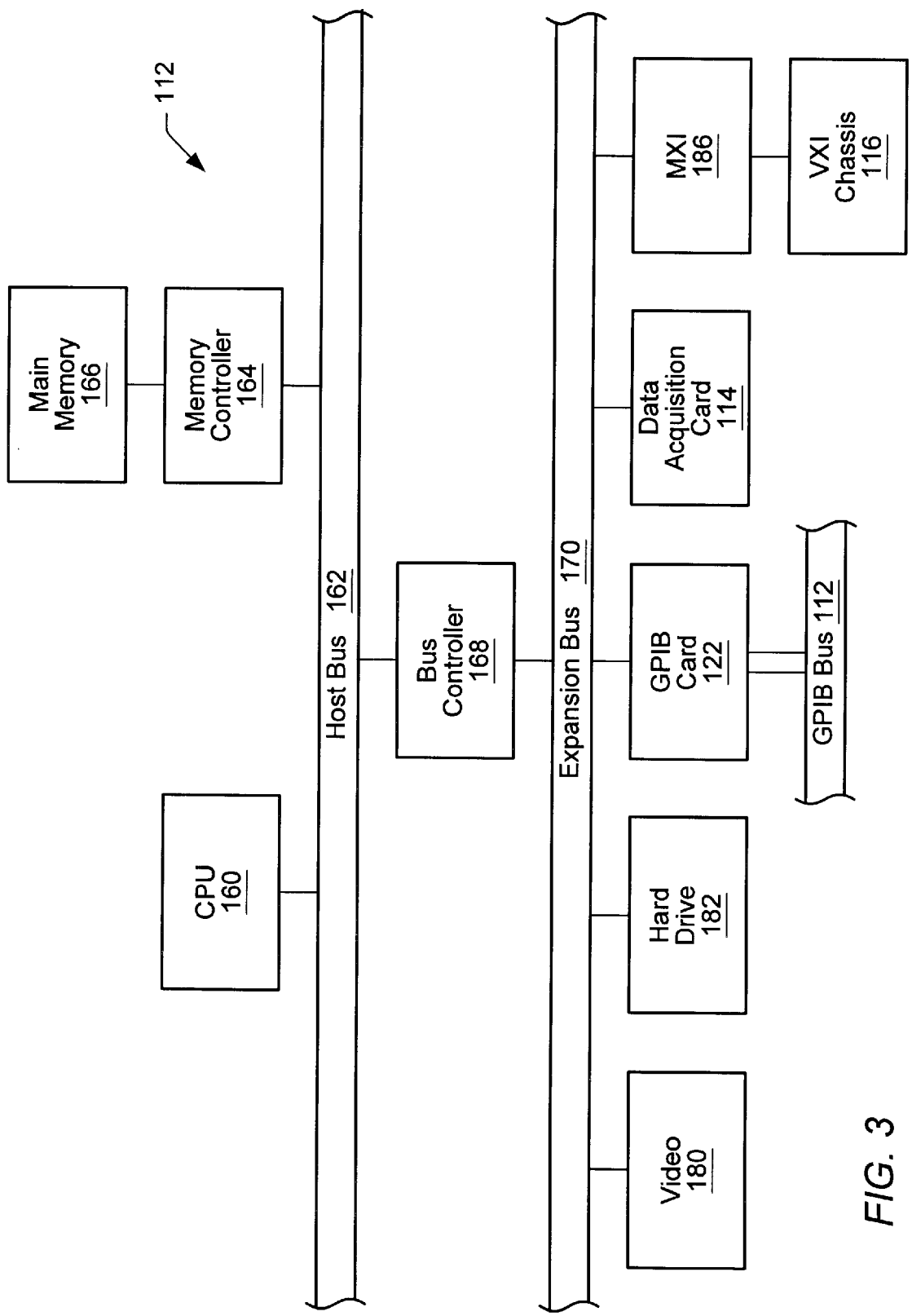
FIG. 3 is a block diagram of the computer system of FIGS. 1, 2A and 2B.

Referring now to FIG. 3, a block diagram of the computer system illustrated in FIGS. 1 and 2 is shown. It is noted that any type of computer system configuration or architecture can be used as desired, and FIG. 3 illustrates a representative PC embodiment. It is also noted that the computer system may be a general purpose computer system as shown in FIGS. 2A and 2B, a computer implemented on a VXI card installed in a VXI chassis, a computer implemented on a PXI card installed in a PXI chassis, or other types of embodiments. The elements of a computer not necessary to understand the operation of the present invention have been omitted for simplicity.

The computer 102 includes at least one central processing unit or CPU 160 which is coupled to a processor or host bus 162. The CPU 160 may be any of various types, including an x86 processor, e.g., a Pentium class, a PowerPC processor, a CPU from the SPARC family of RISC processors, as well as others. Main memory 166 is coupled to the host bus 162 by means of memory controller 164.

The main memory 166 stores a program development system, preferably an object-based or component-based program development system as described above. The main memory 166 also stores a Data Socket client according to the present invention. The main memory 166 also stores operating system software as well as the software for operation of the computer system, as well known to those skilled in the art. The Data Socket client will be discussed in more detail below.

The host bus 162 is coupled to an expansion or input/output bus 170 by means of a bus controller 168 or bus bridge logic. The expansion bus 170 is preferably the PCI (Peripheral Component Interconnect) expansion bus, although other bus types can be used. The expansion bus 170 includes slots for various devices such as the data acquisition board 114 (of FIG. 1), a GPIB interface card 122 which provides a GPIB bus interface to the GPIB instrument 112 (of FIG. 1), and a VXI or MXI bus card 186 coupled to the VXI chassis 116 for receiving VXI instruments. The computer 102 further comprises a video display subsystem 180 and hard drive 182 coupled to the expansion bus 170.

Data Socket Client and FlexData—Sharing Information Across Systems and Applications

Data Socket Overview

The Data Socket client, also referred to as "Data Socket", comprises a set of tools which simplify the exchange of data and information between an application and a number of different data sources and targets. These sources and target are other entities in the system that data is written to or that data is read from and include other applications, files, HTTP servers, OLE/ActiveX automation servers and more. In many cases these sources and targets may be located on a different machine from the one performing the read and write operations. The term "Data Socket" is an umbrella name for tools in different formats, such as ActiveX controls, java applets, LabVIEW VIs, and CVI instrument drivers, using a common technology for data exchange.

The data format used by Data Socket tools, called Flex Data or FlexData, is enhanced for instrumentation style data and may include attributes in addition to the actual data. Data attributes may include information such as an acquisition rate, test operator name, time stamp, quality of data, etc. The Flex Data data format may be readily adapted for other applications and may include other application-specific attributes, as desired.

Data Socket tools allow users to easily transfer instrumentation style data between different applications, applications and files, as well as different machines. Currently these types of transfer are done using less specialized tools such as general-purpose file I/O functions, TCP/IP functions, HTTP/HTML transfers combined with CGI programs and more. With all of these existing technologies, the user is required to perform a significant amount of programming to accomplish his/her tasks. The Data Socket client and tools of the present invention provide improved functionality and reduce development effort and time.

Data Socket source and targets are addressed using URLs (universal resource locator) that follow the standard URL model. Data Socket supports standard transfer formats including http:, ftp:, and file: and defines additional transfer formats. Data Socket also includes an extension mechanism that allows users to add support for future formats with out modifying existing programs that use the Data Socket.

Underlying Technologies

OLE/ActiveX

ActiveX and COM (component object model) are preferably used in much of the underlying architecture of the Data Socket tools including the Data Socket server (DataServer) and data object (CWData ActiveX object).

TCP/IP

TCP/IP (transfer control protocol/internet protocol) is used to transfer data between the DataServer and different Data Socket clients.

HTTP

HTTP (hyper text transfer protocol) is used to make requests from Data Socket clients to web servers and return the information.

FTP

FTP (file transfer protocol) is used to make requests from Data Socket clients to FTP servers and return information stored in a file.

URL

URLs (universal resource locator) are used to address or identify a Data Socket client's source or target. A URL string starts with its access method, such as http:, which the client uses to determine how to connect to the source or target.

Components

Data Socket Client

The Data Socket client, also referred to as the Data Socket control, is the name used to refer to the component that an application uses to connect to a Data Socket source or target. Data Socket clients have different formats for different development environments. (ActiveX control, LabVIEW VI, CVI instrument driver/DLL, etc.)

Flex Data

Flex Data, also referred to as FlexData, is the format of the underlying data packet that Data Socket tools use to send and store information. These packets are system independent and can be transferred over existing communication technologies such as ActiveX Automation/COM or TCP/IP. The Flex Data data packet has provisions for adding standard and user defined named attributes that are used to further describe the information contained in the packet. For instrumentation-specific functions, information such as a time stamp, test operator name, Unit-Under-Test (UUT) identifier, and more can be added to the data being transferred. Data Socket clients convert data native to an environment and its attributes into Flex Data format or convert Flex Data formatted data back into its native data form. The Flex Data packet is self-describing so no additional information must be exchanged between a client and its source or target.

Data Object

The Data Socket data object (CWData ActiveX object) is used in conjunction with the Data Socket ActiveX control to store data along with all additional attributes.

Data Socket Server

The Data Socket server is a stand-alone process running on a system to facilitate transfer of data between different processes when no other servers are in place. In many cases Data Socket clients exchange information with some other type of server such as a web server, automation server or file server. In cases where a customer desires to directly transfer information between Data Socket clients, the Data Socket server preferably acts as the intermediate data repository. The Data Socket server is dynamically configurable such that any Data Socket can create tags (storage locations) in the Data Socket server. Any Data Socket client can then retrieve the stored information based on the name of the tag.

Implementations

ActiveX control

The Data Socket client functionality is preferably implemented with an ActiveX control and underlying objects. The ActiveX control is preferably optimized for Microsoft Visual Basic/VBA(Visual Basic for Applications)/VB Script but is also compatible with other ActiveX control containers including Microsoft Visual C/C++, Borland Delphi, Borland C++ Builder and National Instruments HiQ 4.0. The Data Socket ActiveX control is part of the ComponentWorks tools suite available from National Instruments Corporation and is called CWData Socket. One other significant ActiveX component is the CWData object which stores data transferred by the CWData Socket control.

LabVIEW VIs

LabVIEW/BridgeVIEW VIs implement the same Data Socket client functionality as the ActiveX control in a form native to the G programming syntax.

Instrument Driver

An instrument driver developed in LabWindows/CVI implements the same basic Data Socket client functionality as the ActiveX control. The instrument driver includes function panels for use in the LabWindows/CVI environment and allows creation of a DLL containing a type library. Natively in CVI the instrument driver should also support CVI callback functions to implement Data Socket client events.

Java Bean

One embodiment of the invention comprises a Java bean developed in Java that implements the same basic Data Socket client functionality as the ActiveX control. The bean is written in "Pure Java" and can be run on several different computer platforms.

Additional Components

URL AccessMethod Extensions

The Data Socket client includes built-in support for standard sources such as files, FTP and HTTP. Other built-in support includes exchange with a Data Socket DataServer using TCP/IP, referred to as DSTP. Developers are also able to define their own extensions or plug-ins that allow the Data Socket to connect to their own data sources. Extensions are identified by the URL access method. The URL Access is the part of the URL string that precedes the first colon ":". A Data Socket extension is preferably implemented using an automation server written to a common specification. The automation server and unique extension name are registered with the operating system. The Data Socket client uses the automation server when it detects the corresponding access method, which is not supported natively but is registered with the OS. Applications of Data Socket extensions include direct links to OPC servers, external instruments, Data Acquisition (DAQ) devices, databases, multimedia devices, and others.

File Adapter Extensions

The Data Socket clients support certain common file formats such as tab delimited text when performing file I/O operations. As noted above, the user can also create their own file adapters that the Data Socket client will use to read or write files using custom-defined formats. The file name extension or other explicitly stated identifier determines the file format used for a particular operation. File adapters preferably comprise automation servers that are written to a common specification and registered with the operating system.

User Control

Data Socket provides user level tools and utilities to interact and work more easily with Data Socket. A Data Socket user control provides a simple pre-defined user interface for entering a URL, connecting to the source or target, and monitoring the connection status.

Data Browser

Data Browser is a simple utility application that uses a Data Socket client to connect to arbitrary sources and display their data in a suitable form (graphically or text) along with any attributes stored with the data.

Applications

Interactive Web Pages

One primary use of the Data Socket is the ability to develop interactive web or remote interfaces for applications running on a particular machine. Currently there are tools available, including the LabVIEW and CVI Internet Toolkits, to provide some amount of interaction between a web browser and an application running on a server. However this interaction is very limited in most cases or requires significant amounts of programming using CGI and HTML image maps. The Data Socket tools of the present invention enable a user to very simply build a remote application that can interact with the main application to send updated information or commands back and forth. The Data Socket client, e.g., a Data Socket ActiveX control, also enables a user to simply build such a remote application in a web page and provide a web browser-based interactive interface to a server application. Applications such as running remote experiments or providing web based supervisory control to an automation process become feasible and relatively simple to implement.

Universal Input API for Programming

The Data Socket may thus be used as the primary means to retrieve data into a user's application, thus greatly simplifying the task compared with using traditional I/O mechanisms like file 10. For example, by using the Data Socket to read in waveforms to display in a graph, the user's application is relieved from all tasks related to parsing raw data since the Data Socket returns the Waveform as an easy to use array of numbers. Thus an application can read data from files of many different formats, or from many different sources, such as ftp, http(web), or file servers. An end user can even allow the application to read waveforms from new file formats or new hardware devices by creating a new Data Socket extension.

Broadcast Distribution of Live Data

A data acquisition application can use a Data Socket client or control to write live data to a Data Socket Server that in turns distributes data to other DataSockets that have connected to the server to read data from the server. This method is advantageous over typical current scenarios since the data passed can include attributes that do not interfere with the primary value being sent. This allows the source Data Socket to add new attributes with out breaking the Data Socket clients that are reading the Data.

The Data Socket can also be used in multimedia applications for live or distributed video, including streaming video applications and multicast video. In this application, the multimedia or video application uses a Data Socket client or control to write live data to a Data Socket Server that in turns distributes data to other Data Sockets that have connected to the server.

Figure 4:
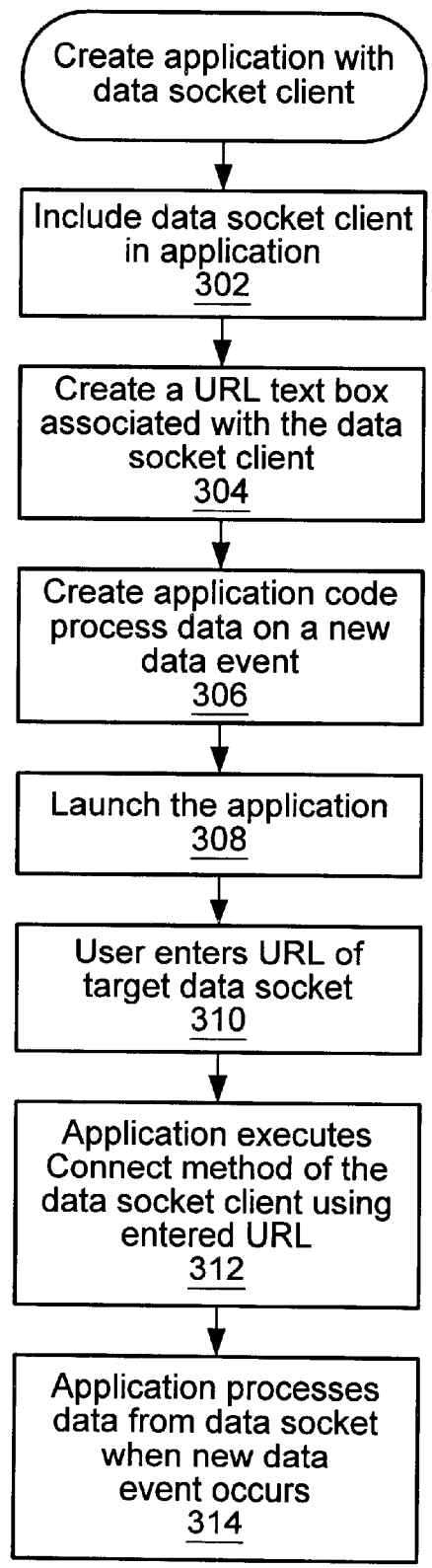
FIG. 4 is a flowchart diagram illustrating use of the Data Socket client of the present invention.

FIG. 4—Flowchart Diagram

FIG. 4 is a flowchart diagram illustrating creation and use of a Data Socket client according to the preferred embodiment of the present invention. It is noted that various steps in FIG. 4 may occur concurrently and/or in different orders.

As shown, in step 302 the user includes or incorporates the Data Socket client into an application.

Where the Data Socket client is a control, the user drops the Data Socket control, which is preferably a standard interface compliant control, onto a window of a container in step 302. An example of the window is a Visual Basic form. The standard control interface is preferably the interface defined by the Microsoft ActiveX Control Specification. Controls which conform to the ActiveX OLE Control Specification are referred to as ActiveX controls. The control dropped in step 302 is preferably embodied within the National Instruments" "ComponentWorks" product, which comprises ActiveX controls. The ComponentWorks controls are described herein being used by the Microsoft Visual Basic development environment container. However, the ComponentWorks controls described may be employed in, but not limited to, the following list of containers: Microsoft Visual FoxPro, Microsoft Access, Borland Delphi, Microsoft Visual C++, Borland C++, Microsoft Internet Explorer, Netscape Navigator, Microsoft Internet Developer Studio, National Instruments HiQ, and any other container which supports the ActiveX control specification.

The Data Socket client may also take other forms for different development environments, such as a LabVIEW Virtual Instrument (VI), a DLL (dynamic linked library), or an instrument driver/DLL, among others. In these environments, the Data Socket client is included in an application in a similar manner to other re-useable software components.

In step 304 the user creates a URL (Uniform Resource Locator) input mechanism, e.g., a URL text box, associated with the Data Socket client. Thus, as part of configuring an application which accesses data from the Data Socket target, the user creates a URL text box for entering a URL which specifies the location of the Data Socket being accessed. In an alternate embodiment, the Data Socket client includes the URL text box as part of its graphical user interface, and thus the user is not required to separately create the URL text box for the Data Socket client. Other mechanisms or user input means may be used for receiving the URL or data address, such as pull down menus, etc.

In step 306 the user creates application code in the application to process received data on a new event. Thus, when an event is triggered indicating that data has been received, this application code executes to process the data according to the desired application being performed.

In step 308 the user launches the application.

In step 310 the user enters the URL of the target Data Socket. It is noted that the URL can also be entered or configured during creation of the application, i.e., prior to launching the application in step 308.

In step 312 the application executes a Connect method of the Data Socket client using the URL received in step 310. The Connect method operates to access the Data Socket specified by the URL and to retrieve the data for the application. This may also involve converting the data to a different format, such as the Flex Data format described herein. A more detailed discussion of execution of the Connect method of the Data Socket client is discussed with reference to the flowchart of FIG. 5.

When the Data Socket client generates an event signifying receipt of new data, then in step 314 the application processes the data from the Data Socket.

It is noted that steps 310–314 may be performed one or more times during the execution of the application, as desired.

It is also noted that other addressing schemes are contemplated for steps 304, 310, and 312. Thus, depending on the evolution of the Internet and http, if other mechanisms are used for accessing data or web sites, these other mechanisms may be used in steps 304, 310 and 312. In addition, if the present invention is used with other or later developed broadband networks, other types of accessing information may be used. Thus the term "URL" is intended to include similar methodologies for accessing data, web sites, etc.

Figure 5A:
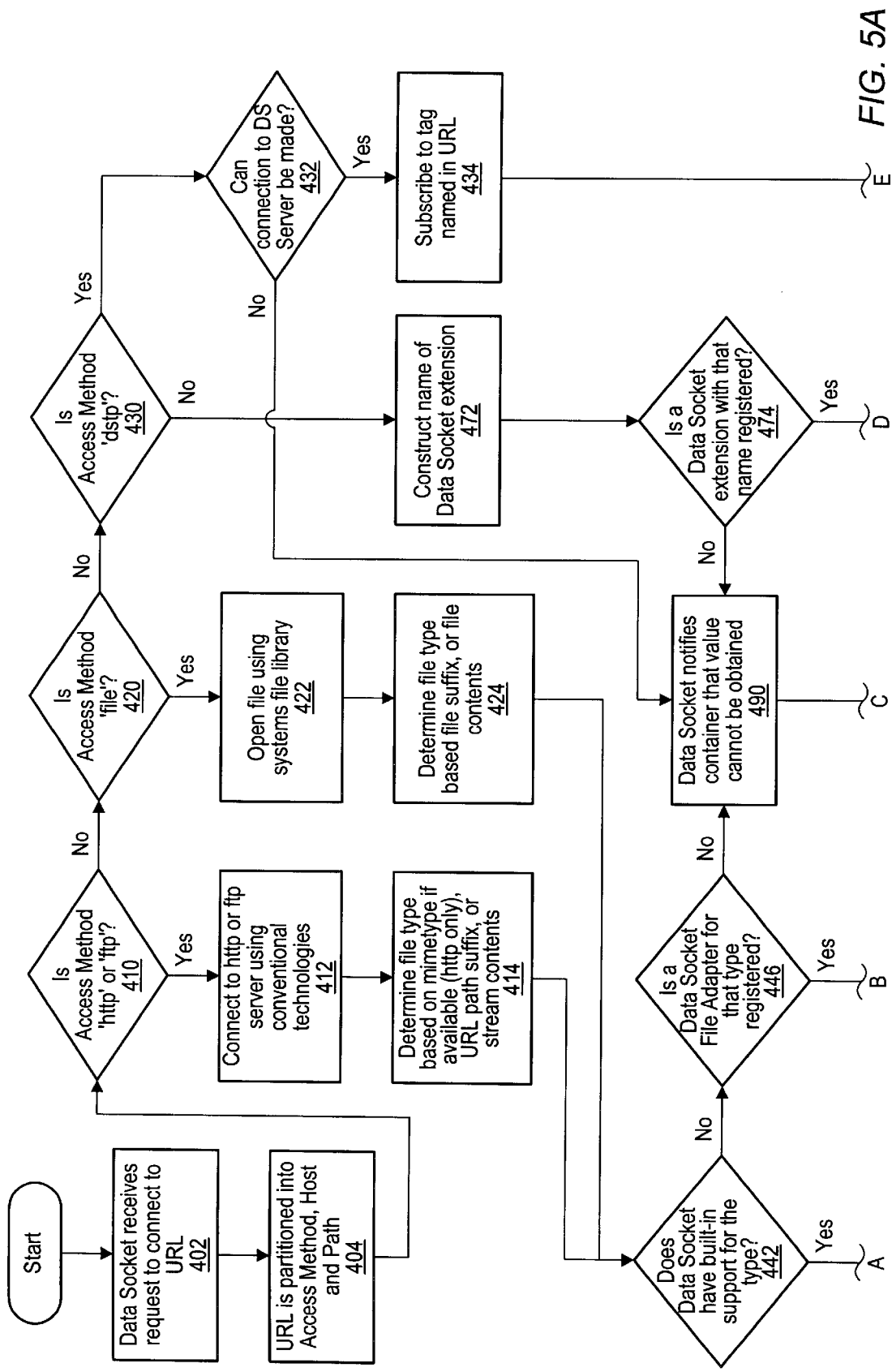
FIGS. 5A and 5B are a flowchart diagram illustrating execution of the Data Socket client of the present invention.
Figure 5B:
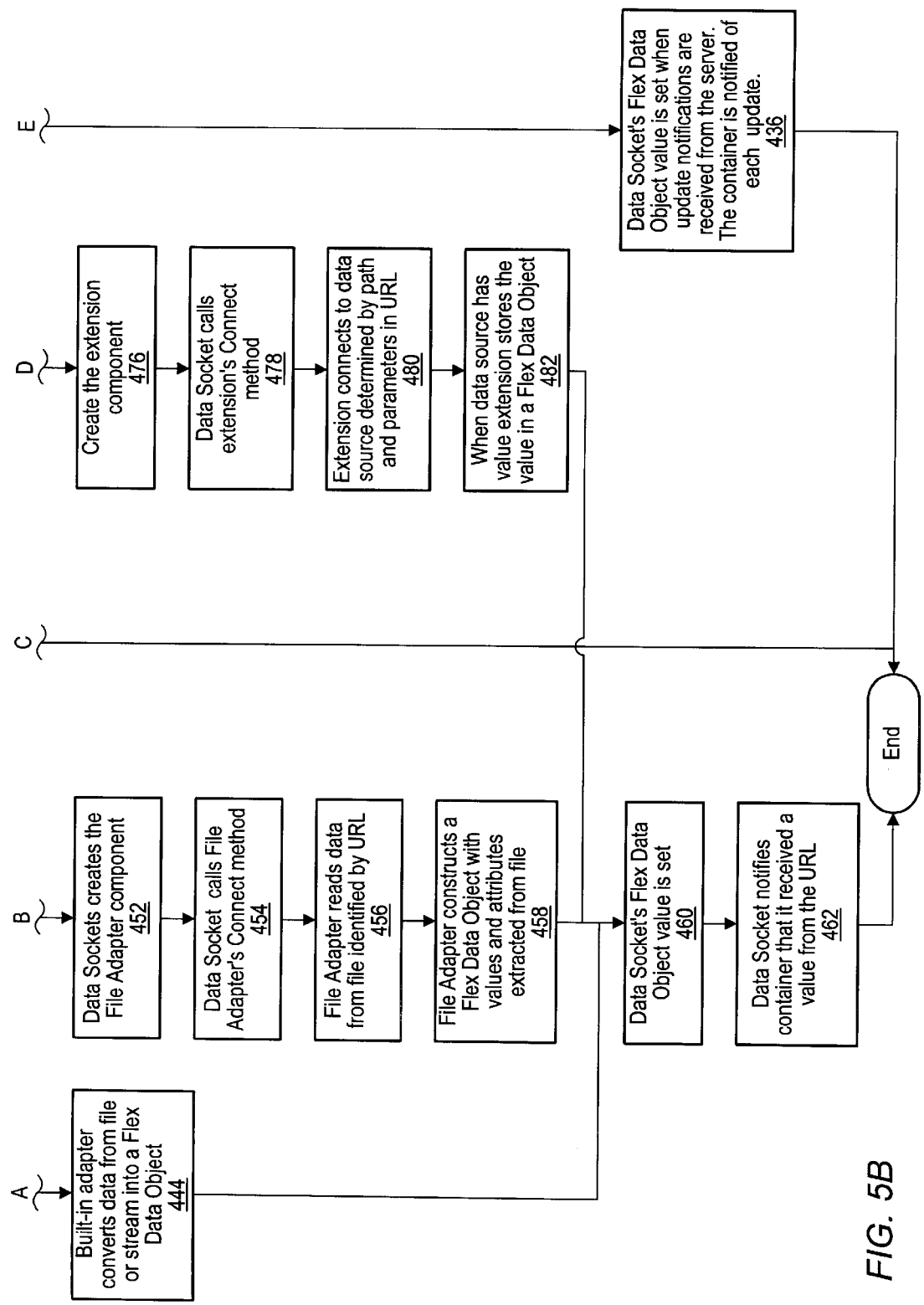

FIGS. 5A–5B: Connect Method Flowchart Diagram

FIGS. 5A–5B comprise a flowchart diagram illustrating the Connect method in the Data Socket client according to the preferred embodiment of the invention. It is noted that various steps in FIGS. 5A–5B may occur concurrently and/or in different orders. Also, FIGS. 5A–5B illustrate the preferred embodiment of the invention. However, it is noted that the system and method of the present invention may be implemented in various ways, as desired.

As shown, in step 402 the Data Socket client receives the request to connect to the specified URL. In other words, the user has entered the URL of the target Data Socket in step 310 of FIG. 4, and in step 402 the Data Socket client receives this user input.

In step 404 the Data Socket client partitions the URL into an AccessMethod, Host and Path. The AccessMethod of the URL preferably comprises the first entry in the URL, e.g., either http, ftp, file or dstp. Other AccessMethods are also contemplated. The "Host" portion specifies the host computer where the data is located, and the "Path" specifies the path where the data is located on the host computer.

If the AccessMethod is either http or ftp as determined in step 410, then in step 412 the Data Socket client connects to the http or ftp server using conventional technology, e.g., using conventional Internet technology.

After step 412, in step 414 the Data Socket client determines the file type. The Data Socket client determines the file type for http based on the mime type. The Data Socket client may also determine the file type based on the URL path suffix and/or the stream contents. After step 414, operation proceeds to step 442.

If the access method is "file" as determined in step 420, then in step 422 the Data Socket client opens the file using the system's file library. In step 424 the Data Socket client determines the file type based on the file suffix or the file contents. After step 424, operation advances to step 442.

After the Data Socket client has determined the file type in either of steps 414 or 424, in step 442 the Data Socket client determines if it has built-in support for the type. If the Data Socket client has built-in support for the file type as determined in step 442, then in step 444 the built-in adapter comprised in the Data Socket client converts the data from the file or stream into a Flex Data object, also referred to as a FlexDataObject.

In step 444 the Data Socket client converts the data into a form more usable by a typical programming language or application. Examples of data converted by the Data Socket include WAV files, tabbed text files, DSD files, and text. For example, if the data is retrieved from a spreadsheet, the Data Socket client converts the tab delimited spreadsheet data into a 2D array of numbers, without any tabs or ASCII strings. This 2D array of numbers is not required to be parsed by the containing application. Also, in general, a number of engineering formats exist for storing vectors or arrays. The Data Socket client preferably operates to convert data of these various formats into arrays of data or numbers for direct use by the application. After step 444, operation proceeds to step 460.

In step 460 the Flex Data object value in the Data Socket client is set. This means that the data which was converted into the more usable form in step 444, such as a 2d array, is now stored in memory managed by an object that is accessible by the client program. In the current embodiment the client application can get a copy value from the Flex Data object by call a method on the Flex Data object named "GetValue". This method preferably returns a copy of the value stored in a VARIANT, a structure defined by Microsoft as part of its ActiveX standard for component software. The Value of attributes can be gotten by calling a method named GetAttribute, or set by calling a method called SetAttribute. A VARIANT structure is used for attributes as well. The VARIANT structure can hold simple data types like numbers or Boolean values and data types that require additional memory for storage such as strings and arrays.

In step 462 the Data Socket client notifies the container or application that it has received a value from the URL, preferably through a new data event. Operation then completes.

If the Data Socket client does not include built-in support for the file type as determined in step 442, then in step 446 the Data Socket client determines if a Data Socket file adapter is registered for that type. A Data Socket file adapter is created by a user and registered with the Data Socket. The Data Socket file adapter is used to read or write files using custom-defined formats. If a Data Socket file adapter is not registered for that type, then in step 490 the Data Socket client notifies the container or application that the value cannot be retrieved, and operation completes.

If a Data Socket file adapter is registered for that file type as determined in step 446, then in step 452 the Data Socket creates the file adapter component or client. In step 454 the Data Socket client calls or invokes the file adapter's Connect method. In step 456 the file adapter reads data from the file identified by the URL. In step 458 the file adapter constructs a Flex Data object with values and attributes extracted from the file.

After steps 452–458 have been performed, in step 460 Flex Data object value in the Data Socket client is set, and in step 462 the Data Socket client notifies the container or application that it has received a value from the URL, and operation completes.

If the access method is "dstp" as determined in step 430, then in step 432 the Data Socket client attempts to make a connection to the Data Socket server identified by the URL using the host name or Internet address encoded in the URL according to standard URL syntax. As described above, the access mode "dstp" directs the Data Socket client to connect to the Data Socket server identified in the URL. If the connection is established in step 432, then in step 434 the Data Socket client sends a command indicating a request to subscribe to a specific tag, or to write the value of a specific tag maintained by the Data Socket server. The Data Socket client preferably sends this command over TCP/IP. If the specific tag does not exist on the server, then the server may create the tag and give it an initial value, or may report back an error indicating that that the requested tag does not exist. This is a configuration option on the Data Socket server. Reporting errors is preferably done by sending commands over the TCP/IP connection. Commands are preferably sequences of bytes sent over a TCP/IP connection.

After step 434, as updates are received in step 436, the Data Socket client sets the value in the. Data Socket's Flex Data object and notifies the container. Thus, each time update notifications are received from the server, the Flex Data object is set and the container or application is notified of each update. Step 436 is continually performed as data is received until the container instructs the Data Socket client to disconnect from the URL to which it is connected.

If the access method is not "dstp" as determined in step 430, and is not either http, ftp, or file as determined in steps 410 and 420, then in step 472 the Data Socket client derives or constructs the name of an extension or plug-in from the access method that was specified in the URL. For example, if the access method is "opc" then the name of the extension or plug-in could be "DataSocketPlugIn_opc".

In step 474 the Data Socket client determines if a Data Socket extension or plug-in with that name is registered. Thus, if the access method is not one of the pre-defined types, e.g., http, fip, file, or dstp, in steps 472 and 474 the Data Socket client attempts to intelligently determine the proper extension or plug-in from the access method that was specified in the URL.

If no Data Socket plug-in is registered with the derived name, then the Data Socket client notifies the application or container that the value cannot be retrieved in step 490, and operation completes.

If a Data Socket plug-in is registered for the determined extension name as determined in step 474, then steps 476–482 are performed.

In step 476 the Data Socket client creates an extension component based on the registered Data Socket extension. In other words, Data Socket client instantiates a component from the registered Data Socket extension.

In step 478 the Data Socket client calls the extension component's Connect method. In step 480 the extension or plug-in connects to the data source determined by the path and parameters in the URL. In step 482, when the data source has a value, the extension stores the value in a Flex Data object and operation then advances to 460. As discussed above, in steps 460 and 462 the Data Socket client's Flex Data object value is set and the Data Socket client notifies the container that it has received a value from the URL, and operation then completes.

Figure 6:
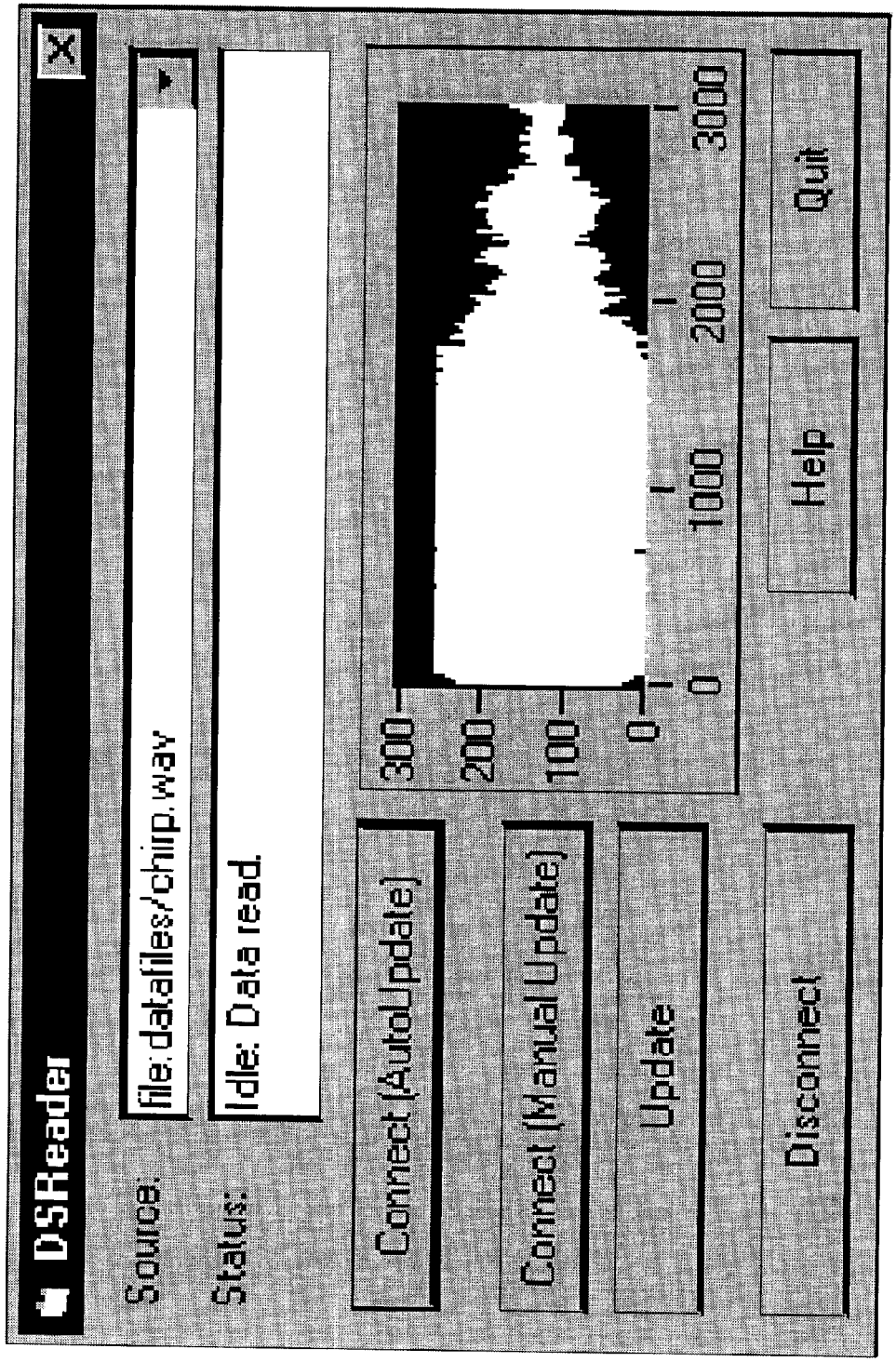
FIG. 6 is a screen shot illustrating use and operation of the Data Socket client of the present invention to read data.

FIG. 6—Using Data Socket to Read a Wav File

FIG. 6 illustrates an example of reading a sound file or .wav file using the Data Socket tools of the present invention. In this example, a file called "chirp.wav" is stored as a standard Windows WAV file. In using the Data Socket, the user provides the application and/or the Data Socket client with a universal resource locator (URL) that identifies the file. The Data Socket tool reads the WAV file and converts the data into an array, which is displayed on the graph. More specifically, the Data Socket client uses the URL to find and open the .WAV file chirp.wav, which is a sound file. The Data Socket client opens the file, and the extension or plug-in converts the data directly into a one dimensional array of samples, which are the sample points of the array. This ID array of samples is directly useable by the application. Without the Data Socket client, the user would be required to create code to open the file, read the header and determine how to parse the data, which would necessarily be specific to a sound file. With the Data Socket control the application is allowed to know nothing about file I/O and nothing about .wav files. The Data Socket client/tools can also be used to read multiple channels of data (stereo) stored in a file display, wherein each channel is, for example, separately plotted on the graph.

Thus the user provides the URL to the Data Socket, and the Data Socket is responsible for "converting" the URL into a block of meaningful data. In other words, the Data Socket uses the URL to find the data, obtain the data, convert the data to a more useful format, and then provide the formatted data to the application.

Figure 7:
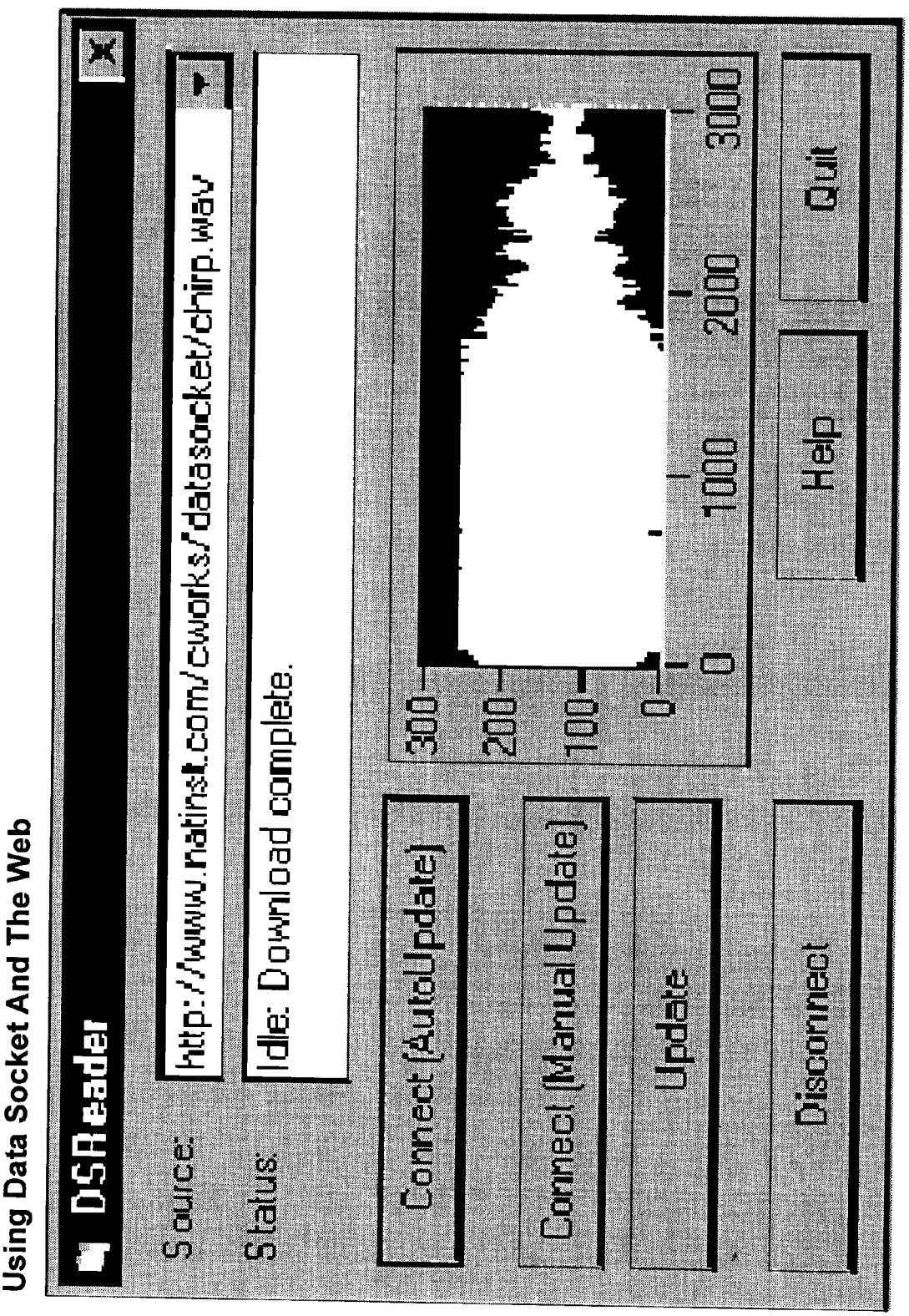
FIG. 7 is a screen shot illustrating use and operation of the Data Socket client of the present invention to read data over the Internet.

FIG. 7—Using Data Socket to Read Data from the Web

FIG. 7 illustrates an example of using the Data Socket to read data from a file served by a http (web) server. As shown, the Data Socket tools are operable to make a request to a standard Web server and interpret the file returned from the server in a similar manner to reading a file from a local drive. The example of FIG. 7 is similar to that of FIG. 6, except that in the example of FIG. 7 the file "chirp.wav" is accessed from a remote computer through the Internet. In FIG. 7 the user specifies a URL to the application and/or the Data Socket client, wherein the URL identifies the web server and file name. The Data Socket client reads the WAV file using the Internet and converts the data into an array, which the application can then use to display on a graph.

Figure 8:
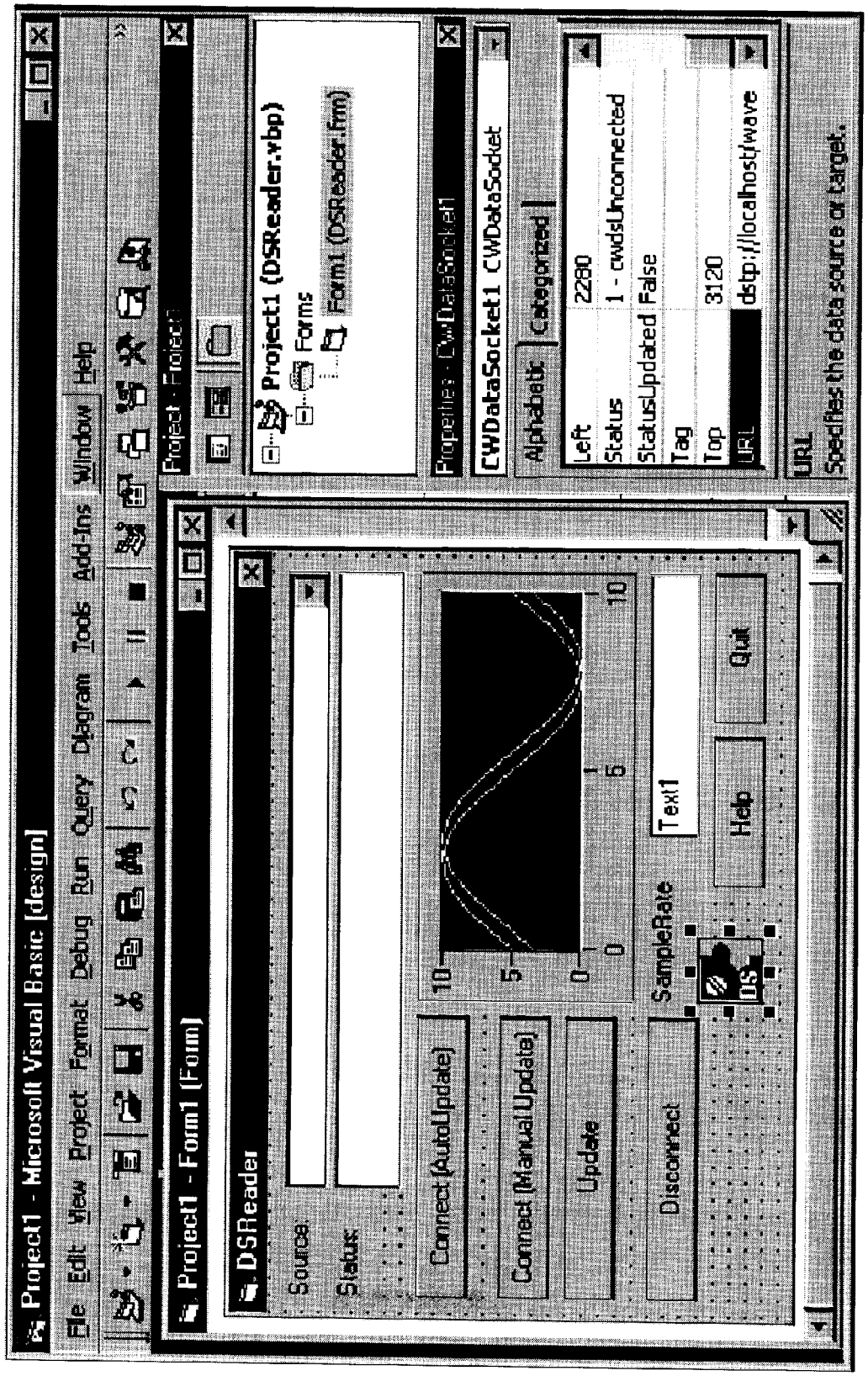
FIGS. 8 and 9 illustrate an example wherein the Data Socket component is used in a Visual Basic application.
Figure 9:
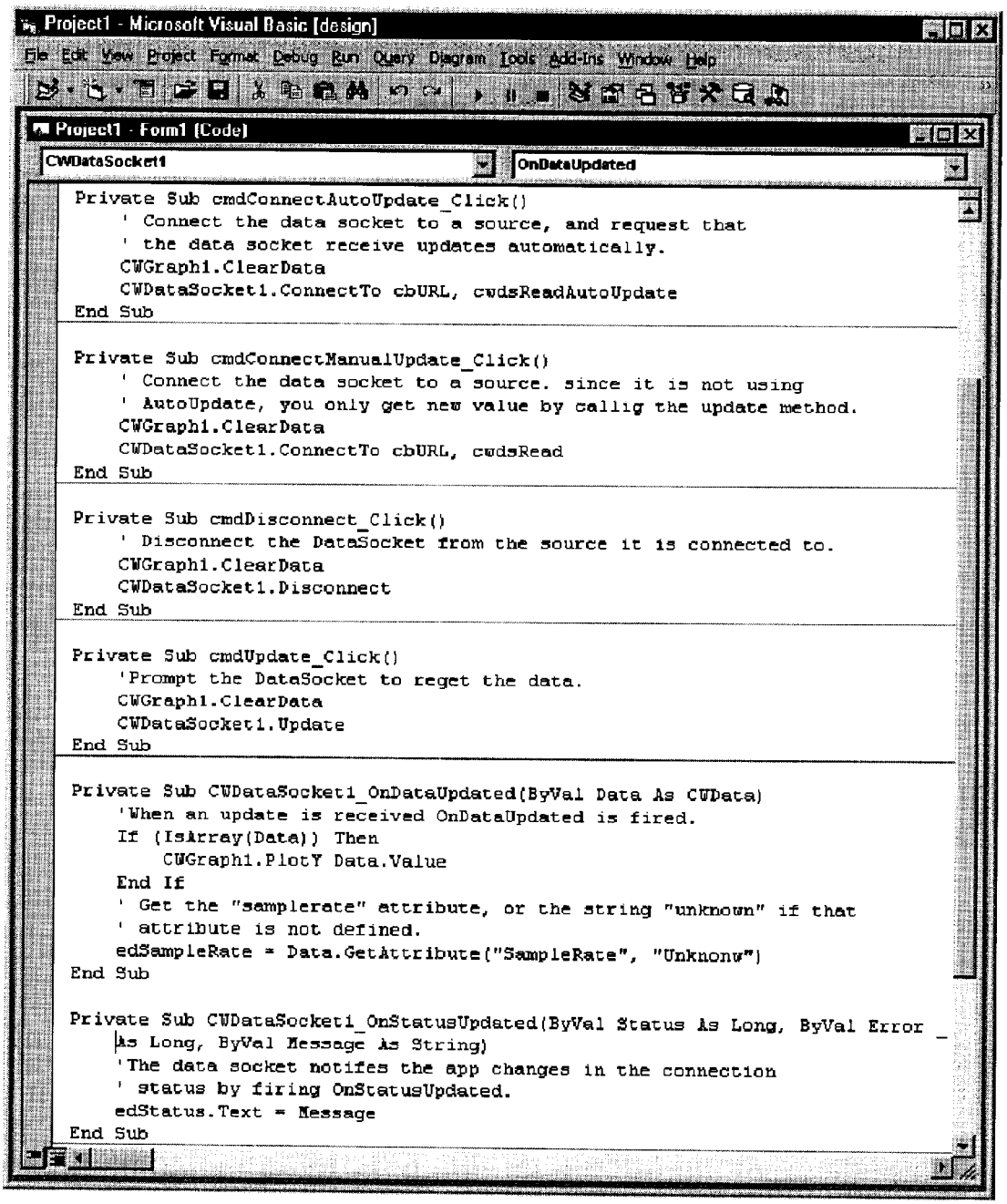

FIGS. 8 and 9—the Data Socket Component in a Visual Basic Application

FIGS. 8 and 9 illustrate an example where the Data Socket client is configured as an ActiveX component and used in a Visual Basic application. FIG. 8 illustrates the Data Socket ActiveX control on a Visual Basic form, and FIG. 9 illustrates the corresponding Visual Basic code. In this example, the Data Socket client is used to reference the URL dstp://localhost/wave. As shown, in order to connect the Data Socket control to a data source or target, the user is only required to include code which calls one method specifying the data source using a URL and the connection type, either a read or write. The URL can specify a file, Web server, FTP server, or a Data Socket server connected to another DataSocket control in another application. The URL can specify other data sources, as desired.

The VB code which calls the method specifying the data source is:

CWDataSocket1.ConnectTo cbURL, cwdsReadAutoUpdate

In AutoUpdate mode, data is automatically exchanged between the Data Socket control and the data source or target whenever the data changes. In ReadAutoUpdate mode, the control fires an event when new data becomes available. In the event handler, the user can configure the application to process the new data as desired.

FIG. 9 illustrates one example of Visual Basic code for the program depicted in FIG. 8. The Visual Basic code shown in FIG. 9 includes comments which explain the operation of the code. As shown, the code first operates to connect the Data Socket client to a source and requests that the Data Socket receive updates automatically. The second block of code operates to connect the Data Socket client to a source. However, since "Auto Update" is not being used in this instance, a new value is only received by calling the update method. The next block of code operates to disconnect the Data Socket client from the source to which it is connected. The fourth block of code operates to prompt the Data Socket to re-obtain the data. The fifth block of code operates to configure the Data Socket whereby when an update is received, the event "On Data Updated" is fired. As shown in the code, when an array of data is received, this code operates to graph the data. This code also operates to obtain a sample rate attribute from the received data. The final portion of code in FIG. 7 configures the Data Socket client to notify the application regarding changes in the connection status using the event "On Status Updated".

Figure 10:
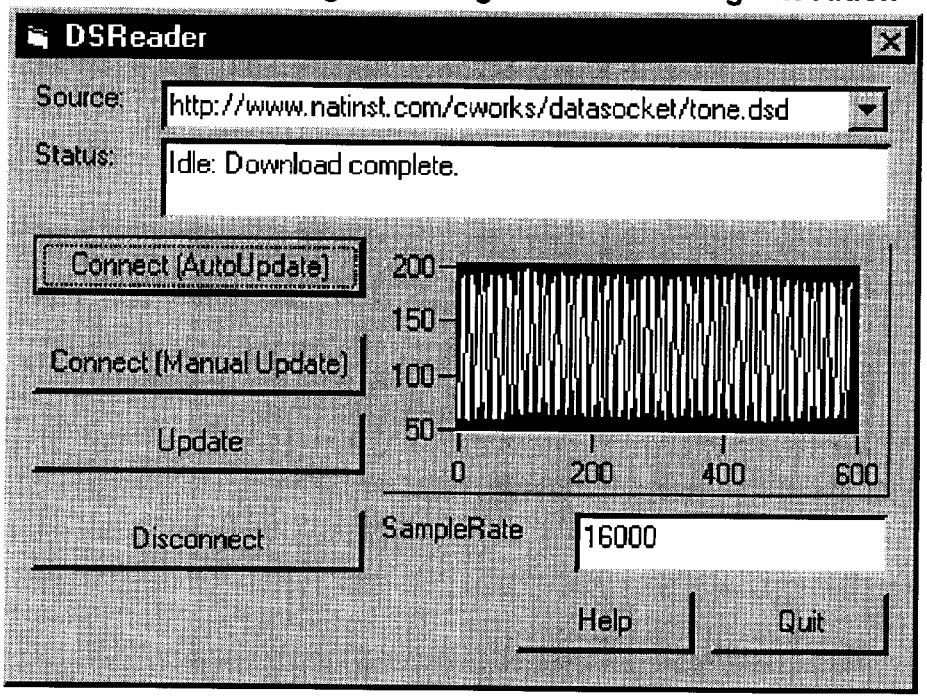
FIG. 10 illustrates the Visual Basic program of FIGS. 8 and 9 during execution.

FIG. 10—the Visual Basic Program During Execution

FIG. 10 illustrates the visual basic program of FIGS. 8 and 9 during execution. In this case, the Data Socket client has connected to the data located at the data source identified by the URL http://www.natinst.com/cworks/datasocket/tone.dsd. The sample rate attribute is shown as 16000, meaning 16,000 samples per second.

Figure 11:
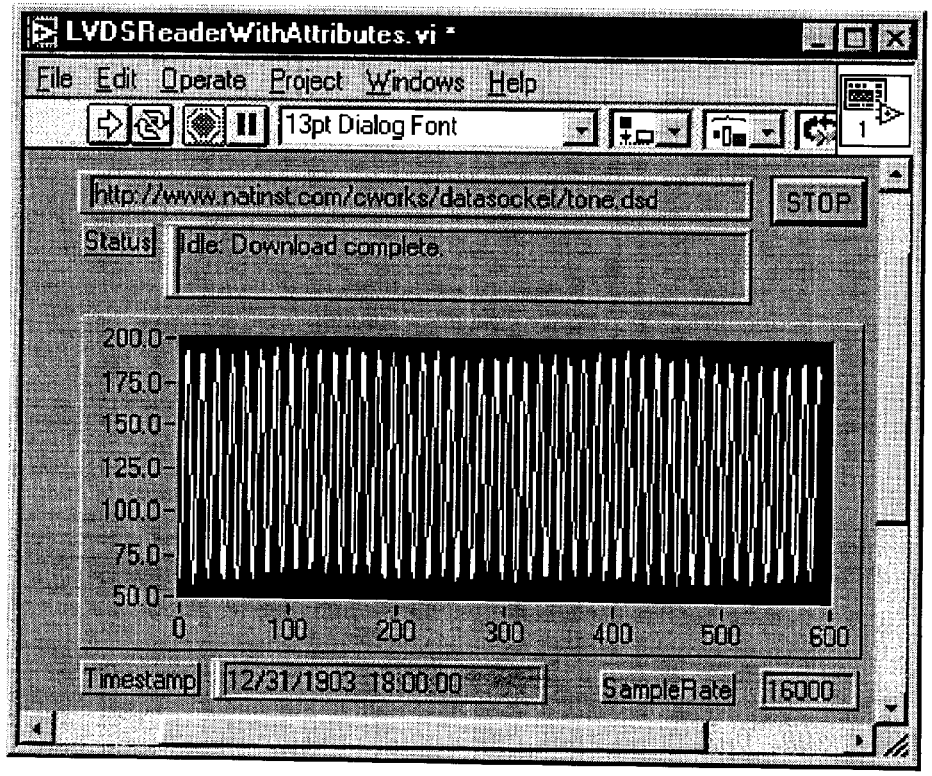
FIGS. 11 and 12 illustrate an example wherein the Data Socket is used in a LabVIEW application.
Figure 12:
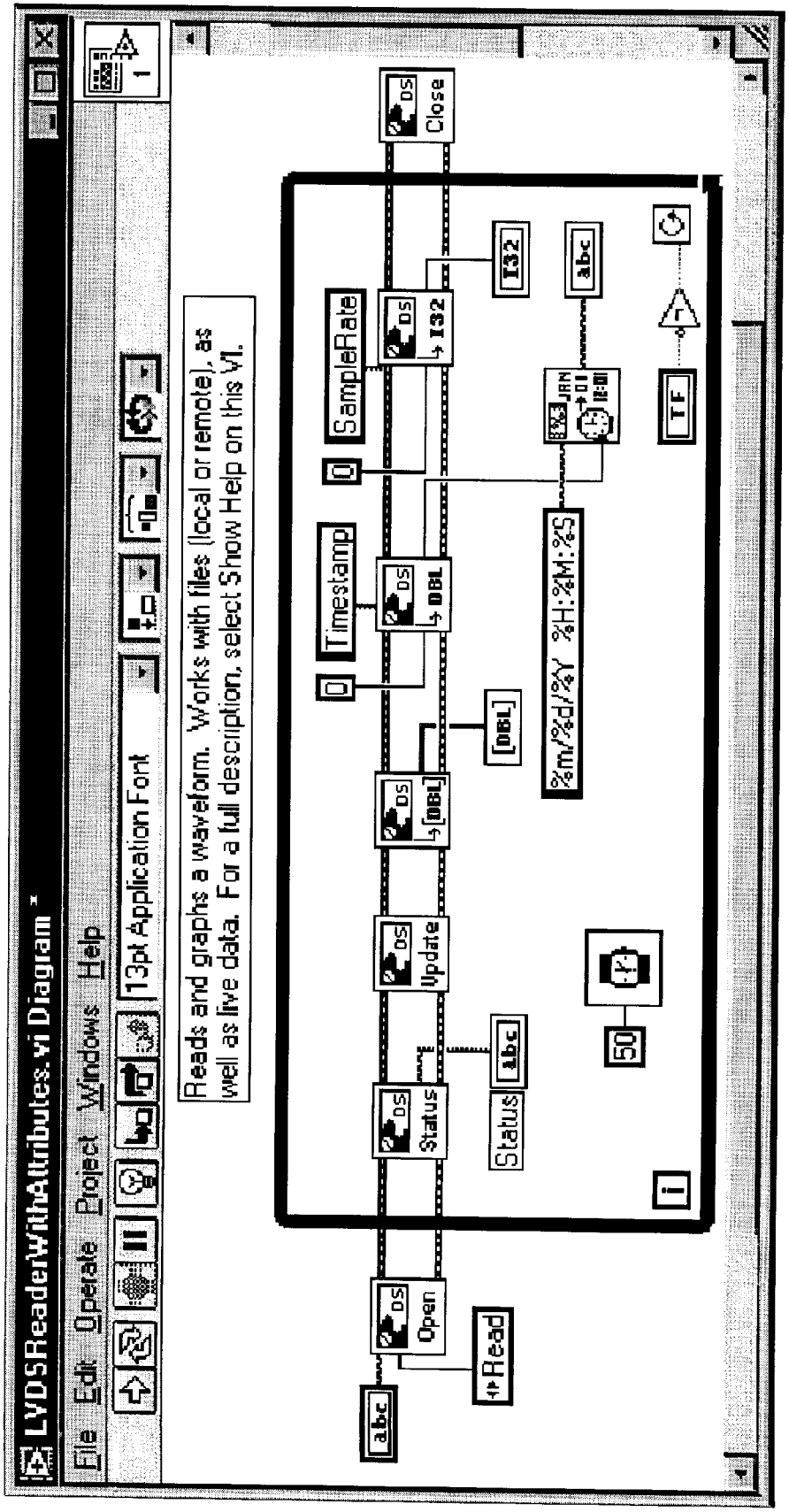

FIGS. 11 and 12—Using Data Socket in a LabVIEW Application

FIGS. 11 and 12 illustrate a graphical programming application, e.g., a LabVIEW application, using the Data Socket. FIG. 11 illustrates the front panel of the LabVIEW application, and FIG. 12 illustrates the block diagram of the LabVIEW application. Thus, as shown in FIGS. 11 and 12, in one embodiment a graphical programming system, such as LabVIEW, includes Data Socket function nodes which are used to create a graphical program, wherein the graphical program utilizes Data Socket for obtaining/transmitting data. Data Socket nodes can be used in any of various graphical programming systems, including LabVIEW, HP Vee, Visual Designer, DasyLab, and DiaDem, among others.

The Data Socket function nodes or VIs are used to open a connection, read or write data, and close the connection. This is similar to exchanging data with a file (open file, read/write data, close file). To create a new connection to a data source or target, the Data Socket Open VI is used, wherein the user specifies the data source using a URL. Then, the Data Socket Read or Write VIs are used to exchange data. The data can be passed or is returned as native LabVIEW data types that can be used in all LabVIEW VIs, such as for plotting on a graph. Finally, the Data Socket Close VI operates to close the connection. Thus the user preferably selects various ones of the Data Socket nodes, as well as other nodes or VIs, and configures or connects the nodes to create a desired graphical program.

The LabVIEW graphical program shown in FIGS. 11 and 12 includes various Data Socket nodes, including a Data Socket open node, a Data Socket status node, a Data Socket update node, and a Data Socket close node, among others. As shown in FIG. 12, the Data Socket open node operates to receive an input configuring the Data Socket client for a read operation and receives a string value comprising the URL, wherein the URL indicates the location of the data source, i.e., of the data being read. The Data Socket open node provides an output to a Data Socket status node.

The Data Socket status node operates to provide a description of the attempt to make a connection in the form of a string that can be displayed to the user. Status strings may include error messages such as "file not found", "permission denied", "bad URL syntax", and others. It may also include informative non error messages such as "connected to Data Socket Server", or, as depicted in FIG. 11, "Download complete." The Data Socket status node operates to provide an output to a Data Socket update node.

The Data Socket update node operates to request a new value to be read from the source that the Data Socket is connected to. The Data Socket update node operates to provide an output to a Data Socket "read vector of doubles" node. The "read vector of doubles" node operates to provide a copy of the data, in the form of double precision floating point numbers retrieved from the source to the graph displayed on the front panel. If no data has been retrieved from the source, or the data type of the source is not reasonably interpreted as a vector of double precision floating point numbers then the "read vector of doubles" node provides an empty array to the graph which displays a blank graph display. The Data Socket "read vector of doubles" node also operates to provide an output to a Data Socket "read double" node. This node is similar to the "read vector of doubles" node except that in this case an attribute name is also provided as input. This means that instead of attempting to interpret the value retrieved from the source as a double, the Data Socket will check to see if an attribute named "Timestamp" was included with the value retrieved from the source. The Data Socket "read double" node operates to provide a double precision floating point number representing the value of the "Timestamp" attribute to the "format date and time" node, which in turn operates to provide a string representing the value of the time stamp. The DataSocket "read double" node also operates to provide an output to the Data Socket "read 32bit integer" node which operates similarly to the Data Socket "read double" node except that the attribute requested is named "SampleRate". Upon the final execution of the while loop, the "Read32BitInteger" node operates to provide an output to the Data Socket close node that closes the connection to the source connected to as initiated by the Data Socket open node.

Figure 13:
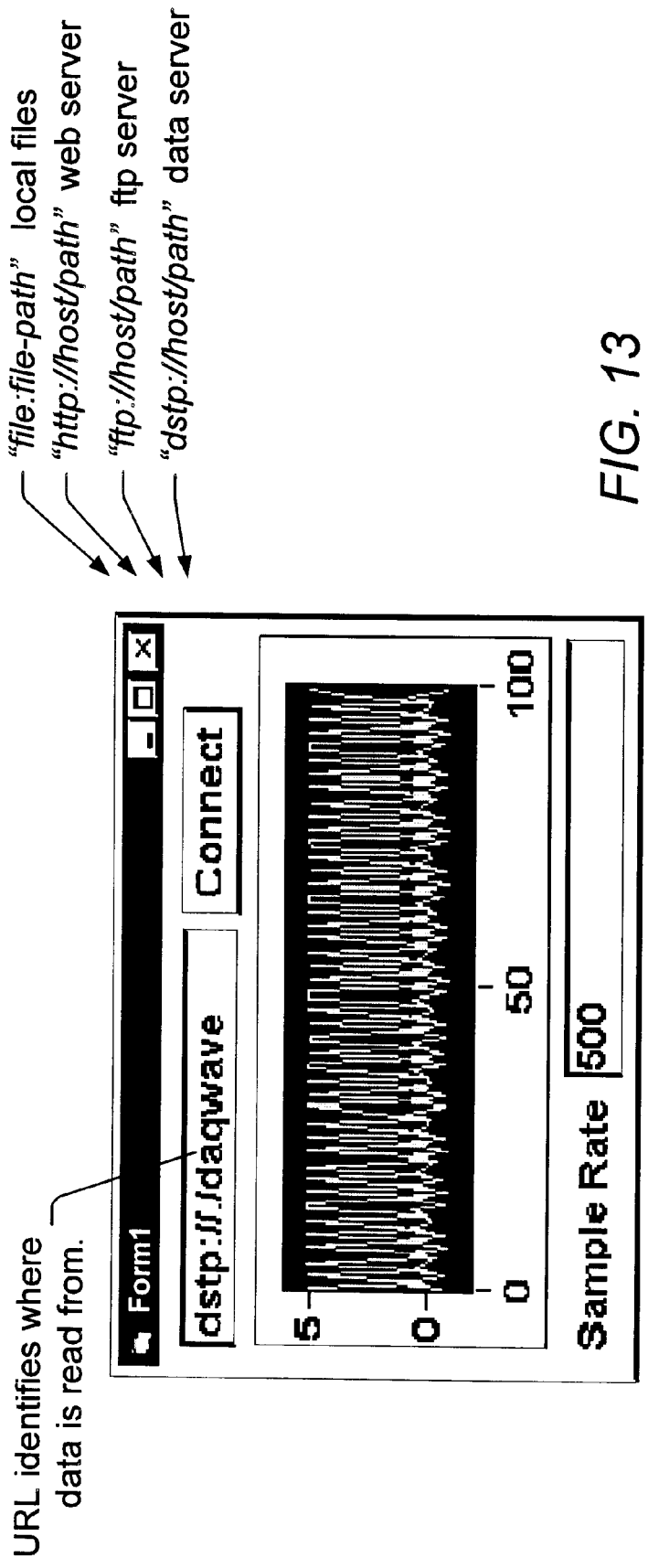
FIG. 13 illustrates the Data Socket connecting to different data source types.

FIG. 13—Connecting to Different Data Sources

FIG. 13 illustrates how the Data Socket of the present invention can be used to connect to different data sources. With Data Socket, a standard universal resource locator (URL) is used to specify one of a number of different data sources or targets. Possible data connections include files on local and network drives, Web servers, FTP servers, and Data Socket data servers, among others.

The first part of the URL specifies the type of connection being made. Thus "file:" represents local files, "http" represents an Internet sever or web server, "ftp" represents an ftp server, and "dstp" represents a data server or Data Socket server. As noted above, in the preferred embodiment a connection is made to a Data Socket data server using the prefix 'dstp', representing Data Socket Transfer Protocol. The remainder of the URL identifies the specific machine and file name or item used to read or write the data. With this method, a user or application can quickly and easily switch between different sources and targets without requiring other changes in the application.

Figure 14:
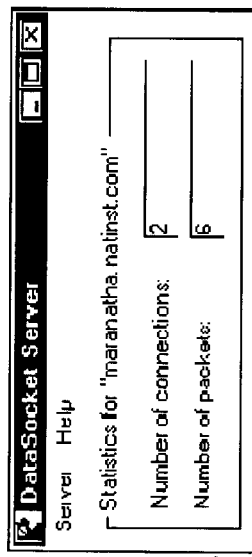
FIGS. 14 and 15 illustrate operation of the Data Socket server.
Figure 14:
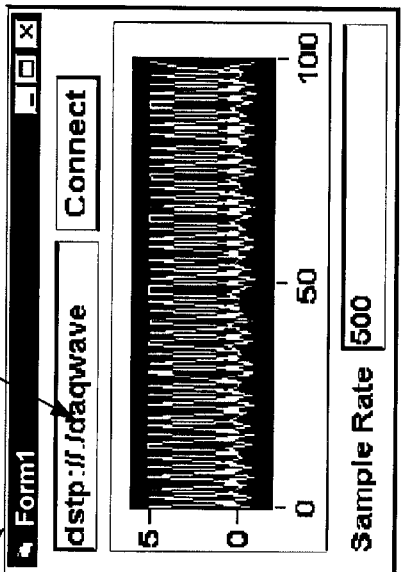
Figure 14:
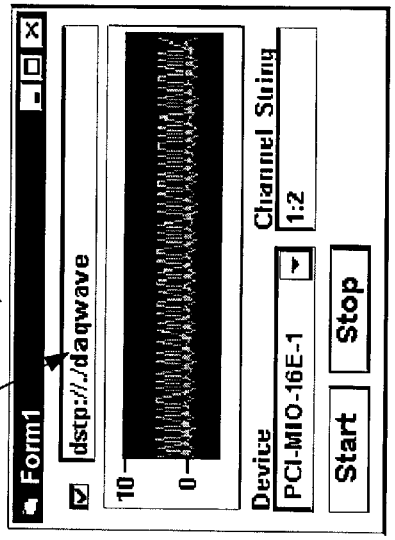

FIG. 14—Data Socket Server Example

FIG. 14 illustrates an example of a Data Socket server. When data is shared between two applications using Data Socket clients or tools, the data is preferably stored in an intermediate data server, referred to as a Data Socket server. The Data Socket server is a separate process (application, executable) running on the same machine as any of the Data Socket clients or on a different machine accessible through a network. Each application connects to the data server using a Data Socket client. The URL for each control identifies the machine on which the server is running and an item name. A Data Socket server can store a number of different data items simultaneously, each identified by a unique item name referred to as a tag. In the preferred embodiment, the data server can be configured for different security levels allowing access to pre-determined list of computers.

In the example of FIG. 14, a first Data Socket client (on the left side of FIG. 14) is configured to write data to the Data Socket server. As shown, the URL identifies the server location where the data is written, in this example to a ComponentWorks Data Socket server (CWDataServer). A second Data Socket client (on the right side of FIG. 14) is configured to read data from the Data Socket server. As shown, the URL can also identify the server location from which data is read.

FIG. 14 also illustrates the use of data attributes with Data Socket. As shown in FIG. 14, the data received by the receiving Data Socket client includes raw data (the waveform) and one or more attributes, e.g., the sample rate. The data attribute is used to transmit the sampling rate of a waveform, which is necessary, for example, to perform a proper spectrum analysis in the client application.

As mentioned above, Data Socket supports the addition of data attributes with the actual data shared or exchanged. This allows the Data Socket to better handle engineering and scientific data that may require additional information passed with the data. In the preferred embodiment, the data source defines custom data attributes by name and specifies a value for each attribute. These attributes are automatically shared as part of the data with other data targets, such as other applications or a file. The Data Socket server automatically handles attributes when distributing the data item.

The developer defines attributes for the source application. Any of various types or kinds of attributes can be defined. For example, in a test and measurement application, the attribute can be things such as sampling rate, timestamp, quality information, user information, UUT information, and more. Data attributes can be easily read by the data target or client and processed or displayed separately from the data, or be used to process the data.

Figure 15:
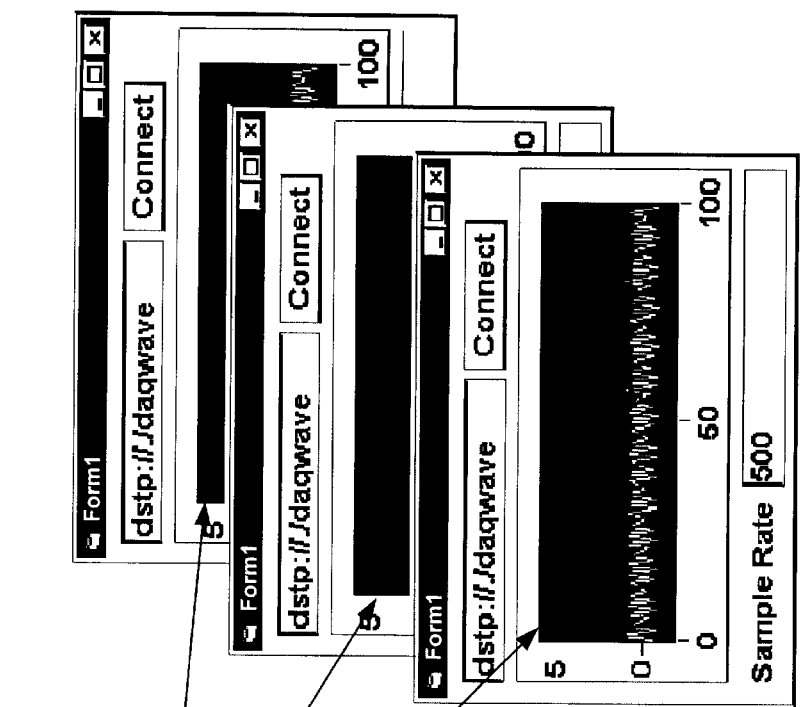
Figure 15:
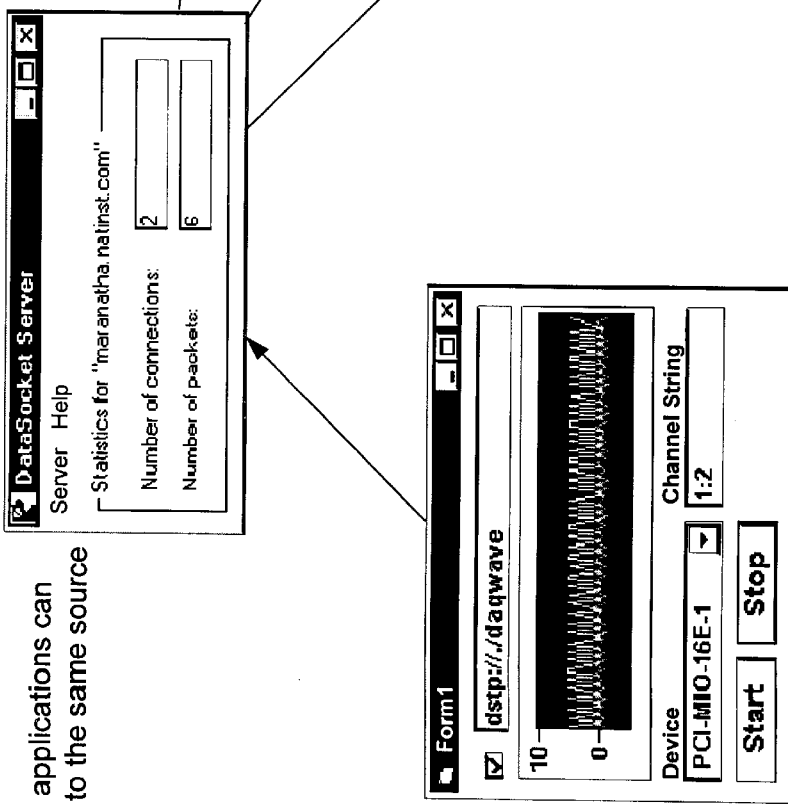

FIG. 15—Data Socket Server Example

FIG. 15 illustrates an example of a Data Socket server receiving data from a single source application and providing the data to a plurality of target applications. In the preferred embodiment, the Data Socket server by default allows multiple read (client) connections to a specific data item, but only one write connection. This is a typical configuration for a post and publish application or broadcast application, in which one application supplies data to a number of different clients.

Using the Data Socket server, the application supplying the data is not required to handle the administrative details of sending data to many different clients, and hence the source application can run more efficiently. The Data Socket server, which can be located on a different machine, assumes the task of redistributing the information. The user can configure the maximum number of data items and maximum number of connections allowed to the server. The user can also configure multiple write connections to a data item at the same time.

Figure 16:
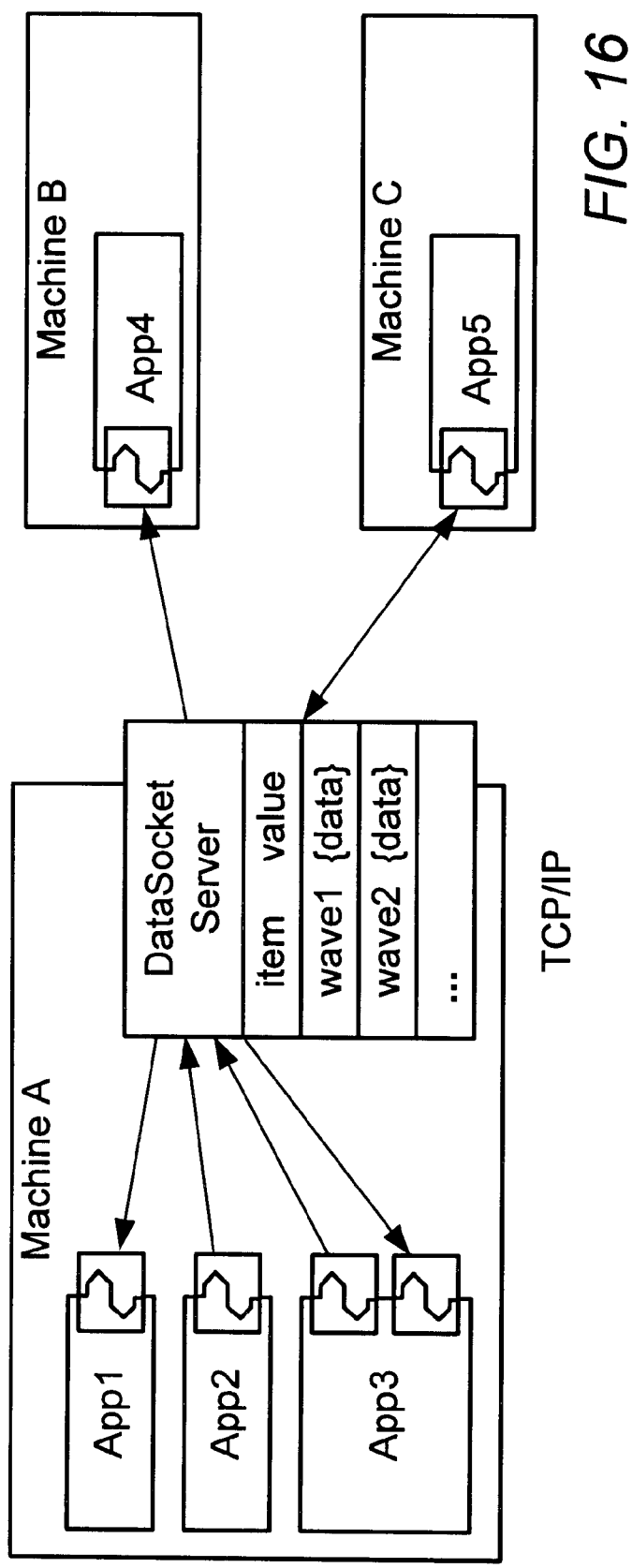
FIG. 16 illustrates operation of the Data Socket transfer protocol.

FIG. 16—Data Socket Transfer Protocol

The present invention uses a protocol referred to as the Data Socket transfer protocol (DSTP) to communicate between the Data Socket tools and the Data Socket server. In the preferred embodiment, the DSTP is based on the industry-standard TCP/IP protocol using a registered user port number 3015. A brief description of the protocol used in the preferred embodiment follows:

Message Formats:

All messages are made up of packets of bytes comprising the following parts.

1. [message_length] A 4-byte integer field (in little-endian) describes the length of the entire message in bytes, including the 4-byte header.
2. [message_format] A 2-byte enumeration that describes the binary format of the data in the message_data field. Types include 1,2,4,8 byte integers, 4 & 8 byte floating-point numbers, ASCII and UNICODE strings. There are two special enumeration values. The first, "array", is followed by a nested message whose type field describes the array element type. The second special enumeration value "cluster" is followed by a two byte count and then by series of nested messages each describing one element of data that follows in the message_data section.
3. [message_data] Optional data in the format identified by the second field. In the case of arrays and clusters, there may be more than one value.

Message Types:

Kinds of messages:

Messages are sent as a block of values stored in the "cluster" format described above. The first element is the op code, subsequent elements are parameters, if necessary, for the specific op code.

1. Greeting exchange, protocol version exchange.
2. Request from client to subscribe to an item maintained by the server. items are identified by a ASCII or UNICODE string.
3. Request from client to server to cancel any existing subscription on an item
4. Request from client to server to get an item's value
5. Request from client to server to set an item's value
6. Notification from server to client of an item's value. This may be in response to a subscription or a specific request for the value.
7. Notification from server to the client that the served is being shut down.
8. Notification from client to server that it is closing the connection. (This implies canceling any subscriptions made on the connection.)

Message opcodes:

Opcodes used:

kCWDS_Connect, kCWDS_Disconnect, kCWDS_SetVersion, kCWDS_Logon, kCWDS_Subscribe, kCWDS_Unsubscribe, kCWDS_SetValue, kCWDS_GetValue, Message Sequences:
Sequences:

With the exception of the greeting messages, the client, or server never waits for a reply. Either the client or server can cancel the session at any time by sending the appropriate "disconnect" message.

Protocol functions:
Funcions:

Getting, setting, and subscribing to values of items stored in a database maintained by a server.

Name of the port:
nati-dstp

Data Socket handles all tasks of converting data and data attributes from their native application format (strings, arrays, Booleans, etc.) into a TCP/IP suitable format, referred to as the Flex Data format, and converting back from the Flex Data format on the client end. Because the DSTP network communication only requires TCP/IP support, the Data Socket can be used to share information through many different types of networks, including the Internet. The Data Socket can be used to share information between machines located on opposite sides of the world using local Internet service providers. Of course, Data Socket and the Data Socket server can be used on a local Windows network or in a single stand-alone computer.

Data Socket Client—Instrumentation Applications

The Data Socket tools of the present invention can be used to provide improved data access characteristics for instrumentation test and measurement process control and industrial automation applications. In effect, the Data Socket tools provide the user with the way to connect to measurements or data using a URL. In other words, the present invention provides a standardized way for accessing all types of data using a convenient graphical user interface method. The basic components of a system which utilize the present invention include a Data Socket application, a Data Socket client, one or more data sources, and preferably a Data Socket browser.

The Data Socket client presents a measurement model for accessing data preferably including methods for connect/ disconnect, configuration, triggering, and events referred to as on data changed and on status changed. As discussed above, the Data Socket client is operable to access data sources using a URL.

The Data Socket browser provides a standard user interface for allowing users to select a data source. The Data Socket browser includes the mechanisms for reporting errors in the URL or the data source, configuring the data source, triggering the data source, e.g., refresh, displaying connection status and system integration, i.e., drag and drop.

The Data Socket application preferably uses a Data Socket browser to select the measurement. The Data Socket application can access various types of data including single points, waveforms, streaming data, or static data. Data sources may also take various forms including protocols such as local files, http or ftp as well as formats including .wav, text and Flex Data.

The present invention also preferably includes Data Socket extensions or plug-ins which are used to map existing resources into a URL address base, these including DAQ, OPC (OLE for process control), IVI (interchangeable virtual instruments), IMAQ, and other user defined resources.

The present invention further includes Data Socket file adapters which users can add to support custom file formats. Data Socket file adapters are easy to write and allow users to separate file I/O from applications. Data Socket file adapters preferably use the file suffix or mime type to select a Data Socket extension.

Thus, the system and method of the present invention provides greatly improved connectivity between the plurality of data producers and data consumers. The present invention further separates I/O APIs from applications and thus greatly reduces programming time. In the instrumentation field, the present invention provides an established measurement model for acquiring data from any of various types of instruments or sources.

Although the system and method the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

I claim:

1. A computer-implemented method for accessing data from a data source in a computer system, wherein the computer system includes a display, the method comprising:

assembling a graphical program on the display, wherein said assembling comprises:
displaying one or more nodes in the graphical program in response to user input;
displaying a first node in response to user input, wherein the first node is operable to access data from a plurality of different data sources;
connecting the one or more nodes and the first node in response to user input;
receiving a uniform resource locator (URL) which specifies the data source, wherein the URL is received in response to user input;

executing the graphical program, wherein said executing comprises:
the first node connecting to the data source and receiving the data comprised in the data source using the URL; and
the first node converting the data into a format useable by the graphical program after the first node connects to the data source and receives the data.

2. The method of claim 1, wherein the first node is a data socket node.

3. The method of claim 1, wherein the first node is connected to provide the data to a second node;
wherein said executing the graphical program further comprises:
the second node receiving and processing the data from the first node after said converting.

4. The method of claim 1, wherein the data is a continuous stream of data, wherein the first node returns the continuous stream of data to the graphical program.

5. The method of claim 1,
wherein the first node connecting to the data source, the first node receiving the data, and the first node converting the data are performed without any user programming required.

6. The method of claim 1, wherein the format is a self-describing format.

7. The method of claim 1, wherein said converting comprises converting the data into a generic format.

8. The method of claim 1, wherein said converting comprises:
converting the data into a first format, wherein the first format includes the data and one or more attributes of the data.

9. The method of claim 8, wherein the data is measurement data, wherein the one or more attributes of the data include one or more of: a timestamp, acquisition rate, quality of data, test operator name, and a unit under test (UUT) identifier.

10. A memory medium comprising program instructions for accessing data from a data source in a computer system, wherein the computer system includes a display, wherein the memory medium stores:
   a graphical program, wherein the graphical program comprises a plurality of connected nodes, wherein the plurality of nodes include a first node, wherein the first node is operable to access data from a plurality of different data sources;
   a uniform resource locator (URL) which specifies the data source, wherein the URL is received in response to user input;
   wherein, during execution of the graphical program:
      the first node is operable to connect to the data source and receive the data from the data source using the URL;
      the first node is operable to convert the data into a format useable by the graphical program after the first node connects to the data source and receives the data.

11. The memory medium of claim 10, wherein the first node is a data socket node.

12. The memory medium of claim 10, wherein the first node is connected to provide the data to a second node; wherein, during execution of the graphical program:
   the second node is operable to receive and process the data from the first node.

13. The memory medium of claim 10, wherein the first node is operable to retrieve a continuous stream of data to the graphical program.

14. The memory medium of claim 10,
   wherein the first node is operable to connect to the data source, receive the data, and convert the data without any user programming required.

15. The memory medium of claim 10, wherein the format is a self-describing format.

16. A computer-implemented method for publishing data to a data target in a computer system, wherein the computer system includes a display, the method comprising:
   assembling a graphical program on the display, wherein said assembling comprises:
      displaying one or more nodes in the graphical program in response to user input;
      displaying a first node in response to user input, wherein the first node is operable to publish data to a plurality of different data targets;
      connecting the one or more nodes and the first node in response to user input, wherein the first node is coupled to receive data from a second node;
      receiving a uniform resource locator (URL) which specifies the data target, wherein the URL is received in response to user input;
   executing the graphical program, wherein said executing comprises:
      the first node receiving data from the second node;
      the first node converting the data into a format useable by the data target; and
      the first node connecting to the data target using the URL and publishing the data to the data target.

17. The method of claim 16, wherein the first node is a data socket node.

18. The method of claim 17, wherein the first node receiving data from the second node, the first node converting the data into a format useable by the data target, and the first node connecting to the data target using the URL and publishing the data to the data target are performed a plurality of times.

19. The method of claim 18, wherein the data is a continuous stream of data, wherein the software component publishes the continuous stream of data to the data target.

20. The method of claim 16,
   wherein the first node receiving data from the application, the first node converting the data into a format useable by the data target, and the first node connecting to the data target using the URL and publishing the data to the data target are performed without any user programming required.

21. The method of claim 16, wherein the format is a self-describing format.

22. The method of claim 16, wherein said converting comprises converting the data into a generic format.

23. The method of claim 16, wherein said converting comprises:
   converting the data into a first format, wherein the first format includes the data and one or more attributes of the data.

24. The method of claim 23, wherein the data is measurement data, wherein the one or more attributes of the data include one or more of: a timestamp, acquisition rate, quality of data, test operator name, and a unit under test (UUT) identifier.

25. A memory medium comprising program instructions for publishing data to a data target in a computer system, wherein the computer system includes a display, wherein the memory medium stores:
   a graphical program, wherein the graphical program comprises a plurality of connected nodes, wherein the plurality of nodes include a first node, wherein the first node is operable to publish data to a plurality of different data targets, wherein the first node is coupled to receive data from a second node;
   a uniform resource locator (URL) which specifies the data target, wherein the URL is received in response to user input;
   wherein, during execution of the graphical program:
      the first node is operable to receive data from the second node;
      the first node is operable to convert the data into a format useable by the data target; and
      the first node is operable to connect to the data target using the URL and publish the data to the data target.

26. The memory medium of claim 25, wherein the first node is a data socket node.

27. The memory medium of claim 25, wherein the first node is operable to publish a continuous stream of data from the graphical program.

28. The memory medium of claim 25,
   wherein the first node is operable to receive data from the second node, convert the data into a format useable by the data target, connect to the data target using the URL and publish the data to the data target without any user programming required.

29. The memory medium of claim 25, wherein the format is a self-describing format.

* * * * *